United States Patent
Katayama et al.

[11] Patent Number: 6,111,016
[45] Date of Patent: Aug. 29, 2000

[54] POLYCARBONATE WITH EPOXIDIZED BLOCK COPOLYMER

[75] Inventors: Masahiro Katayama, Sakai; Masaaki Ito, Himeji; Yoshihiro Otsuka, Otake, all of Japan

[73] Assignee: Daicel Chemical Industries, Ltd., Sakai, Japan

[21] Appl. No.: 09/116,816

[22] Filed: Jul. 17, 1998

[30] Foreign Application Priority Data

| Jul. 23, 1997 | [JP] | Japan | 9-212634 |
| Aug. 4, 1997 | [JP] | Japan | 9-221960 |
| Sep. 3, 1997 | [JP] | Japan | 9-238113 |

[51] Int. Cl.$^7$ ............... C08L 69/00; C08L 53/02
[52] U.S. Cl. ............... 525/92 E; 525/92 H; 525/88; 525/107; 525/65; 525/67; 525/394
[58] Field of Search .................... 525/88, 92 E, 525/92 H, 107, 394

[56] References Cited

U.S. PATENT DOCUMENTS 4,532,283  7/1985  Liu ........................ 525/92 E

FOREIGN PATENT DOCUMENTS

| 0434997A2 | 7/1991 | European Pat. Off. . |
| 3331012C2 | 3/1984 | Germany . |
| 38-15225B | 8/1963 | Japan . |
| 3971 | 1/1964 | Japan . |
| 42-11496B | 6/1967 | Japan . |
| 48-54160A | 7/1973 | Japan . |
| 49-107354A | 10/1974 | Japan . |
| 51-11142B | 4/1976 | Japan . |
| 62-131056A | 6/1987 | Japan . |
| 2247248A | 10/1990 | Japan . |
| 3197554A | 8/1991 | Japan . |
| 9100400A | 4/1997 | Japan . |
| 2004284A | 3/1979 | United Kingdom . |

*Primary Examiner*—James J. Seidleck
*Assistant Examiner*—Olga Asinovsky
*Attorney, Agent, or Firm*—Birch, Stewart, Kolasch & Birch, LLP

[57] ABSTRACT

A thermoplastic resin composition can be obtained by adding about 0.1 to 20 parts by weight of a diene-series block copolymer (2) to 100 parts by weight of a resin composition containing a polycarbonate-series resin (1) as a basic component of which the proportion of terminal hydroxy groups relative to the whole of the terminals is 1 mole % or above (about 5 to 40 mole %). The polycarbonate-series resin base may further comprise a thermoplastic resin composition (3) such as a rubber-modified styrenic resin. The block copolymer component (2) includes an epoxy-modified block copolymer, etc. When added an organophosphorus compound as a flame retardant (4), or a fluorine-containing resin as a flame-retardant auxiliary (5), a halogen-free flame-retardant thermoplastic resin composition can be obtained. A thermoplastic resin with an improved flowability and impact strength can be obtained by modifying a polymer blend of the polycarbonate-series resin and the styrenic-series resin in quality.

18 Claims, 1 Drawing Sheet

Fig. 1

Fig. 2

POLYCARBONATE WITH EPOXIDIZED BLOCK COPOLYMER

FIELD OF THE INVENTION

The present invention relates to a thermoplastic resin composition which is useful as a material for office automation (OA) equipment, communication equipment, housings for household electric appliances, chassis, other shaped articles, automotive parts and so forth. More particularly, the invention relates to a thermoplastic resin composition and a flame-retardant resin composition, which comprise a polycarbonate-series resin and a styrenic-series resin as main components and are excellent in processability or moldability, external appearance properties, impact resistance and thermal stability.

BACKGROUND OF THE INVENTION

Polycarbonate-series resins have good dimensional stability, good mechanical characteristics and good thermal properties (heat resistance) and therefore are in wide industrial use (parts of electric or household electric appliances, precision instruments, OA equipment, medical instruments, household utensils, sports equipment, etc.). However, polycarbonate-series resins are poor in chemical resistance and processability (moldability, platability), in particular flow characteristics, besides being relatively expensive. Therefore, a number of polymer blends thereof with other thermoplastic resins have been developed. There is disclosed that, in Japanese Patent Publication No. 15225/1963 (JP-B-38-1525), Japanese Patent Publication No. 71/1964 (JP-B-39-71), Japanese Patent Publication No. 11496/1967 (JP-B-42-11496), and Japanese Patent Publication No. 11142/1976 (JP-B-51-11142), the moldability of polycarbonate resin can be improved and the thickness-dependency of impact strength is lowered by blending acrylonitrilebutadiene-styrene copolymers (ABS resins) or methyl methacrylate-butadiene-styrene copolymers (MBS resins) among thermoplastic resins with polycarbonate-series resins. For the purpose of flowability or fluidity improvement and cost reduction, such polymer blends are widely used in automotive, OA equipment, electronic and electric fields, among others.

However, polymer blends of a polycarbonate-series resin and a rubber-modified polystyrene resin such as an impact-resistant styrenic resin (high impact polystyrene) are poor in compatibility, mechanical characteristics, heat-stability and impact resistance, and therefore are of little present use.

In Japanese Patent Application Laid-Open No. 197554/1991 (JP-A-3-197554), there is disclosed that the compatibility of an aromatic polycarbonate-series resin with a polyphenylene ether resin can be enhanced by adding a compatibilizing agent and an elastomer component, hence the impact-strength of molded articles can be improved.

Moreover, in Japanese Patent Application Laid-Open No. 54160/1973 (JP-A-48-54160) and No. 107354/1974 (JP-A-49-107354), there is disclosed compositions of an aromatic polycarbonate and a polyester-series resin. These compositions are, however, poor in melt stability and its softening point lowers when the compositions are residence in molding process. In Japanese Patent Application Laid-Open No. 247248/1990 (JP-A-2-247248) and No. 100400/1997 (JP-A-9-100400), attempts at solving these problems have been made, but the effects are still unsatisfactory.

In Japanese Patent Application Laid-Open No. 131056/1987 (JP-A-62-131056), there is disclosed that the surface hardness can be improved by employing a composition of an aromatic polycarbonate and an acrylic resin, hence the abrasion resistance can be improved. The combination of these resins, however, is still poor in compatibility, and effects of improvement in abrasion resistance are not satisfactory.

On the other hand, in the fields of OA equipment and household electric appliances, among others, synthetic resin materials are required to have flame retardancy, and halogen-containing flame retardants, namely bromine- or chlorine-containing ones, are generally used as fire or flame retardants to be added externally. Such flame retardants can provide relatively high fire retardancy but tend to generate corroxive or toxic gases upon processing or combustion. In view of increasing interest in environmental problems in recent years, it is desired that flame-retardant resins free of chlorine- or bromine-containing halogen compounds be developed as means of solving the drawbacks mentioned above.

SUMMARY OF THE INVENTION

Accordingly, it is an object of the present invention to provide a thermoplastic resin composition which is excellent in moldability and useful for producing a molded article having a good external appearance and impact resistance by improving the compatibility of a polycarbonate-series resin with a diene-series block copolymer.

It is another object of the present invention to provide a thermoplastic resin composition which is comparable in flowability and impact resistance to polymer blends of a polycarbonate-series resin and an ABS resin in spite of its being a polymer blend comprising a polycarbonate-series resin, a diene-series block copolymer, and a thermoplastic resin (a rubber-modified styrene-series resin etc.) as main resin components.

Further object of the present invention is to provide a thermoplastic resin composition which is conducive to improvements in the quality of a polymer blend of a polycarbonate-series resin and a thermoplastic resin as main components, with high safety, non-corrosiveness (harmlessness), and high fire retardancy.

The present inventors pursued investigations intensively in order to achieve the above objects and, as a result, found that (i) a combination of a polycarbonate-series resin having a terminal hydroxy group with a diene-series block copolymer enhances the compatibility therebetween, and improves flowability and impact resistance of the resin composition, that (ii), in the combination of a polycarbonate-series resin, a diene-series block copolymer and a thermoplastic resin, the above-mentioned characteristics can considerably be im-proved and its flowability is excellent when compared to that of the polymer blend of the polycarbonate-series resin with an ABS resin, and that (iii) the fire retardancy and impact resistance can be markedly improved by the addition of a flame retardant such as an organophosphorus compound or a flame retardant auxiliary such as a fluorine-contained resin (fluororesin).

Thus, a thermoplastic resin composition of the present invention comprises (1) a polycarbonate-series resin of which the percentage of the terminal hydroxyl group is 1 mole % or above relative to the whole of the terminals, and (2) a diene-series block copolymer. The diene-series block copolymer comprises, in the same molecule, a polymer block (A) comprising mainly a vinyl aromatic compound and a polymer block (B) comprising mainly a conjugated diene compound. The diene-series block copolymer may be a block copolymer (C) comprising, in the same molecule, a polymer block (A) comprising mainly a vinyl aromatic compound and a polymer block (B) comprising mainly a conjugated diene compound; a hydrogenation product (D) of the block copolymer (C); an epoxy-modified or epoxy-introduced block copolymer (E) in which a double bond derived from the block copolymer (C) and/or a conjugated diene compound of the partial hydrogenation product (D) is epoxidized; or an acid-modified or acidic group-introduced block copolymer (F) of the block copolymer (C) and/or the hydrogenation product (D) thereof. The content of the diene-series block copolymer is about 0.1 to 30 parts by weight relative to 100 parts by weight of the polycarbonate-series resin.

Further, the thermoplastic resin composition may be composed of the second thermoplastic resin (3). As the second thermoplastic resin, there may be employed a polyester-series resin, a polyamide-series resin, an aromatic polyether-series resin, a rubber-modified polymer or rubber-containing polymer, a polysulfide-series resin, an acrylic resin, and a polyolefinic resin. The ratio of the polycarbonate-series resin (1) relative to the second thermoplastic resin (3) is about 1/99 to 99/1 (% by weight), and the content of the diene-series copolymer may be about 0.1 to 30 parts by weight relative to 100 parts by weight of the resin composition comprising the polycarbonate-series resin (1) and the second thermoplastic resin (3). The resin composition may contain about 1 to 40 parts by weight of a flame retardant and/or about 0.01 to 30 parts by weight of a flame retardant auxiliary, relative to 100 parts by weight of the resin composition composed of the polycarbonate-series resin (1) and the second thermoplastic styrene-series resin (3).

In the present description, the term "the second thermoplastic resin" means thermoplastic resins other than the polycarbonate-series resin (1) and the diene-series block copolymer (2).

DETAILED DESCRIPTION OF THE INVENTION

Polycarbonate-series Resin (1)

The polycarbonate-series resin of the resin component (1) can be easily produced by a conventional method, e.g., by reacting a divalent phenol with a carbonate precursor by the solution or melt or fusion technique. The polycarbonate-series resin may be produced by (i) a reaction of a divalent phenol with a carbonate precursor such as phosgene or (ii) a transesterification reaction of a divalent phenol with a carbonate precursor such as diphenyl carbonate, in a solvent such as methylene chloride and in the presence of a known acid acceptor or a molecular weight regulator.

Examples of the divalent phenol are 2,2-bis(4-hydroxyphenyl)propane (bisphenol A), 2,2-bis(4-hydroxyphenyl)butane, 2,2-bis(4-hydroxyphenyl)-4-methylpentane, 2,2-bis(4-hydroxyphenyl)octane, bis(4-hydroxyphenyl)methane, 1,1-bis(4-hydroxyphenyl)ethane, 1,1-bis(4-hydroxyphenyl)butane, 2,2-bis(4-hydroxy-3,5-dimethylphenyl)propane, 2,2-bis(4-hydroxy-3-methylphenyl)propane, 2,2-bis(4-hydroxy-3-isopropylphenyl)propane, 2,2-bis(4-hydroxy-3-s-butylphenyl)propane, 2,2-bis(4-hydroxy-3-t-butylphenyl)propane, 2,2-bis(3,5-dibromo-4-hydroxyphenyl)propane, 4,4'-dihydroxy-2,2,2-triphenylethane, bis(4-hydroxyphenyl)sulfone, bis(4-hydroxyphenyl) ether, bis(4-hydroxyphenyl) ketone, bis(4-hydroxyphenyl) sulfide, and hydroquinone.

Preferred divalent phenols are bis(4-hydroxyphenyl) alkanes (e.g. bis(4-hydroxyphenyl)-$C_{1-4}$alkanes), particularly bisphenol A. These divalent phenols may be used either singly or in combination.

The examples of the carbonic ester compound (carbonic diester) are diaryl carbonates such as diphenyl carbonate, ditolyl carbonate, bis (chlorophenyl) carbonate, m-cresylcarbonate, dinaphthyl carbonate, bis(biphenyl) carbonate; dialkyl carbonates such as dimethyl carbonate, diethyl carbonate, dibutyl carbonate, dicyclohexyl carbonate. Among carbonic diesters, diphenyl carbonate is particularly preferred.

When producing a polycarbonate by the melt technique, an acid acceptor (e.g. basic catalyst) is used. As the basic catalyst, there may be exemplified nitrogen-containing basic compounds such as an electron-donative amine, alkaline metal compounds, alkaline earth metal compounds. Preferred catalysts include nitrogen-containing compounds, and borates of alkaline metal compounds or alkaline earth metal compounds, etc. Such catalysts can be used either singly or in combination.

As the electron-donative amine, there may be exemplified pyridines which may have a substituent, such as 2-aminopyridine, 4-aminopyridine, 2-hydroxypyridine, 4-hydroxypyridine, 2-methoxypyridine, 4-methoxypyridine, 4-(4-methyl-1-piperidinyl)pyridine, 4-(4-methylpyrrolidinyl)pyridine; imidazoles which may have a substituent, such as imidazole, 2-methylimidazole, 4-methylimidazole, 2-methoxyimidazole, 2-dimethylaminoimidazole, 2-mercaptoimidazole, aminoquinoline, benzimidazole; diazabicyclooctane (DABCO), 1,8-diazabicyclo[5.4.0]-7-undecene (DBU).

As an acid for forming a counter ion of the electron-donative amine, there may be exemplified organic acids and inorganic acids such as a carbonic acid, formic acid, acetic acid, nitric acid, nitrous acid, oxalic acid, sulfuric acid, phosphoric acid, fluoroboric acid and boron hydride acid.

The alkaline metal compounds include, e.g., hydroxides such as sodium hydroxide, potassium hydroxide, lithium hydroxide; hydrogencarbonates such as sodium hydrogencarbonate, potassium hydrogencarbonate, lithium hydrogencarbonate; carbonates such as sodium carbonate, potassium carbonate, lithium carbonate; aliphatic carboxylates such as acetates and stearates corresponding to the carbonates; borates corresponding to the carbonates; borate hydrides and phenylated borates corresponding to the carbonates,; aromatic carboxylates such as benzoates corresponding to the carbonates; hydrogen phosphate corresponding to the carbonates (e.g. disodium hydrogenphosphate); alkaline metal (sodium, potassium, lithium) salts of bisphenol A or phenol, etc. As the metal compound, metal borates such as sodium borate and acetates such as potassium acetate are preferably used.

The alkaline earth metal compounds include hydroxides of alkaline earth metals (calcium, barium, magnesium, strontium, etc.), hydrogencarbonates, carbonates, aliphatic carboxylates (e.g. acetate, stearate), borates, etc. Borates such as magnesiumborate are particularly preferable.

In the melt technique, the addition of an acid substance for neutralizing the basic catalyst is usually required to conduct the melt transesterification condensation polymerization. Examples of the acid substance include boric acid, ammonium hydrogenphosphite, etc. The acid substance may be used either singly or in combination.

The amount of the acid substance to be added can be selected within the range of about 0.01 to 500 mole relative to 1 mole of the basic catalyst, particularly about 0.01 to 10 mole when the nitrogen-containing basic compound is used as a catalyst, and preferably about 5 to 200 mole when the alkaline or alkaline earth metal compound is used. When the amount of less than 0.01 mole have no effect on heat stabilization, and the amount exceeding 500 mole results in the possibility of suppressing the degree of polymerization.

When feeding the divalent phenol, the carbonic diester and the catalyst, the acid substance may be added with them, or after the reaction begins, at an optional point of time at which the relative viscosity of the polymer (polymer concentration: 0.5 g/dL, 20° C., measured in methylene chloride) reaches about 1.1 or above.

As the molecular weight regulator, there is exemplified various compounds which are usually used in the polymerization of carbonate, e.g., monohydric phenols (e.g. phenol, p-cresol, p-t-butylphenol, p-t-octylphenol, p-cumylphenol, nonylphenol).

The polycarbonate-series resin, as the resin component (1), of the present invention maybe a homopolymer, among the above-mentioned divalent phenols, using a single divalent phenol, a copolymer using plural divalent phenols, or a mixture of plural polycarbonate-series resins.

In aspect of mechanical strength and moldability, the viscosity average molecular weight of the polycarbonate-series resin (1) is about 10,000 to 100,000, preferably about 15,000 to 70,000, particularly about 15,000 to 40,000.

Features of the present invention reside in that a polycarbonate resin having a terminal hydroxy group is used as the polycarbonate resin. In the polycarbonate resin, the percentage of the terminal hydroxy group is 1 mole % or above (e.g. about 1 to 50 mole %), preferably about 1 to 40 mole % (e.g. 5 to 40 mole %), more preferably about 1 to 30 weight % (e.g. 5 to 30 mole %), particularly about 7 to 30 mole % relative to the whole of the terminals. When the concentration of the terminal hydroxy group is less than 1 mole %, the impact strength is not so improved, and when exceeding 50 mole %, the coloring or the degradation of the mechanical properties due to the deterioration of thermal stability are apt to occur. In the production of polycarbonate by the melt technique, usually, it is difficult to keep the percentage of a terminal hydroxy group (phenolic hydroxy group terminal) less than 3 mole %, and is about 3 mole % or above (e.g. 3 to 50 mole %), preferably about 3 to 40 mole % (e.g. 3 to 30 mole %).

The concentration of the terminal hydroxyl group of the polycarbonate-series resin can be adjusted according to the mole ratio the divalent phenol (e.g. bisphenol A) and the carbonate precursor (e.g. diphenyl carbonate). The concentration can also be adjusted by treating the terminal with a monohydric phenol compound. To give an example, when bisphenol A and diphenyl carbonate are used as ingredients, the percentage of the terminal hydroxy group increases with increasing the mole ratio of diphenyl carbonate relative to bisphenol A. However, when the concentration of the terminal hydroxy group becomes high, the possibility of deterioration in color tone or heat-resistant stability may arise. Therefore, the concentration may be adjusted to 50 mole % or less, preferably 40 mole % or less (e.g. 30 mole % or less) in accordance with practical applications.

The percentage of the terminal hydroxyl group can be measured by a prevailing method such as a measuring method using NMR, the Titan process, and a method in which the percentage is calculated based on the amount of terminal OH figured out directly by the ultraviolet (UV) absorption spectrum method or the infrared ray (IR) absorption spectrum method and the molecular weight obtained by the viscosity method or the gel permeation chromatography (GPC).

Diene-series Block Copolymer (2)

One embodiment of the features of the present invention resides in the combination of the polycarbonate-series resin (1) having the terminal hydroxyl group with the diene-series block copolymer (2).

The block copolymer, as the component (2), includes; (i) a block copolymer (C) comprising, in the same molecule, a polymer block (A) comprising mainly a vinyl aromatic compound and a polymer block (B) comprising mainly a conjugated diene compound, and a partial or complete hydrogenation product (D) of the block copolymer (C); (ii) an epoxy-modified or epoxy group-containing block copolymer (E) in which a double bond, due to the conjugated diene compound of the block copolymer (C) and/or the hydrogenation thereof (D), is epoxidized; and (iii) an acid-modified or acid group-containing block copolymer (F) of the block copolymer (C) and/or the hydrogenation thereof (D). These block copolymers (C), (D)(E) and (F) can be used either singly or in combination of two or more.

As the "vinyl aromatic compound", the main component of the polymer block (A) which constitutes the block copolymer (C), there may be exemplified styrene, α-alkylstyrenes (e.g. α-methylstyrene), vinyltoluenes (e.g. p-methylstyrene), p-t-butylstyrene, divinylbenzene, 1,1-diphenylstyrene. Among these compounds, styrene is preferably used. These vinyl aromatic compounds may be used either singly or in combination of two or more.

As the "conjugated diene compound", which is the main component of the polymer block (B) which is constituting the block copolymer (C), there may be exemplified butadiene, isoprene, 1,3-pentadiene, 2,3-dimethyl-1,3-butadiene, piperylene, 3-butyl-1,3-octadiene, phenyl-1,3-butadiene. These conjugated diene compounds may be used either singly or in combination of two or more. Among such compounds, butadiene, isoprene, and the combination thereof are preferable.

The diene-series block copolymer (2) can be produced, with the use of a lithium catalyst or the like in an inert solvent, by a conventional method (e.g., methods disclosed in Japanese Patent Publication No. 23798/1965 (JP-B-23798), Japanese Patent Publication No. 17979/1968 (JP-B-17979), Japanese Patent Publication No. 32415/1971 (JP-B-32415), and Japanese Patent Publication No. 28925/1981 (JP-B-28925)).

The block copolymer (C) comprises, in the same molecule, the polymer block (A) composed of the vinyl aromatic compound and the polymer block (B) composed of the conjugated diene compound. The copolymerization (weight) ratio of the vinyl aromatic compound and the conjugated diene compound may be selected within the range of the vinyl aromatic compound/the conjugated diene compound=about 5/95 to 95/5, preferably about 5/95 to 80/20 (e.g. about 5/95 to 70/30), and particularly about 10/90 to 60/40.

The molecular structure of the block copolymer (C) may be linear, branched, radial, or an arbitrary combination of these. As the structure containing the polymer block (A) and the polymer block (B), there may be mentioned, for example, the following types: A-B, A-B-A, A-B-A-B, (A-B-)$_4$Si, A-B-A-B-A, etc.

In particular, the preferred block copolymers include diene-series block copolymers terminally having a B block, e.g., block copolymers having the linear A-B block structure or the linear A-B-A-B block structure.

The number-average molecular weight of the block copolymer (C) may be selected within the range of, for example, about 5,000 to 600,000, preferably about 10,000 to 500,000 (e.g. about 50,000 to 500,000). The molecular weight distribution [the ratio (Mw/Mn) of the weight-average molecular weight (Mw) and the number-average molecular weight (Mn)] of the block copolymer (C) is preferably about 10 or less (e.g. about 1 to 10), particularly about 1.5 to 7. In such molecular weight distribution, an appropriate level of compatibility among the components can be obtained.

An unsaturated bond of the conjugated diene compound in the block copolymer (C) may be partially or fully hydrogenated to form the completely or partially hydrogenated copolymer (D). The hydrogenation product (D) can be produced by a conventional method, e.g., methods described in Japanese Patent Publication No. 8704/1967 (JP-B-8704), Japanese Patent Publication No. 6636/1968 (JP-B-6636), Japanese Patent Publication No. 133203/1984 (JP-B-133203). The production is conducted, in the presence of a hydrogenation catalyst and in an inert solvent, by hydrogenation. The block copolymer (C) or the partial hydrogenation product (D) can be subjected to modification. Further, the partial or complete hydrogenation product (D) of the block copolymer (C) also can be used to prepare the acid-modified block copolymer (F).

The epoxy-modified or epoxy group-introduced block copolymer (E) can be obtained by reacting the block copolymer (C) and/or the partial hydrogenation product (D) thereof with an epoxydizing agent (e.g. a hydroperoxide, a peracid) in an inert solvent.

As a hydroperoxide, there may be exemplified hydrogen peroxide, t-butyl-hydroperoxide, cumene peroxide. As a peracid, there may be exemplified performic acid, peracetic acid, perbenzoic acid, and trifluoroperacetic acid. In particular, peracetic acid is inexpensive and easy to be avaible, having a high stability, therefore, preferable as an epoxidizing agent.

For epoxidation, a catalyst may be used if necessary. For example, when a hydroperoxide is used as an epoxidizing agent, catalytic effects can be obtained by using, e.g., the mixture of a tungstic acid and a caustic soda, the combination of an organic acid and hydrogen peroxide, or the combination of a molybdenum hexacarbonyl and a t-butyl hydroperoxide. When a peracid is used, catalytic effects can be obtained by using, e.g., the combination of the above mentioned peracid and an alkali (e.g. sodium carbonate) or an acid (e.g. sulfuric acid).

The inert solvent used in a reaction is employed for lowering the viscosity of a raw material or for stabilizing an epoxidizing agent by diluting. As examples of the solvent, there may be mentioned, when a peracetic acid is used as an epoxidizing agent, aliphatic hydrocarbons such as hexane, alicyclic hydrocarbons such as cyclohexane, aromatic compounds (e.g. aromatic hydrocarbons such as benzene, toluene), ethers such as diethyl ether, and esters such as ethyl acetate. Preferred solvents include, e.g., hexane, cyclohexane, toluene, benzene, ethyl acetate, and haloalkanes (e.g. methylene chloride, carbon tetrachloride, chloroform).

Reaction conditions for epoxidation are not particularly restricted. The reaction temperature may be selected depending on the reactivity of the epoxidizing agent used. For example, when a peracid is used, the reaction temperature of about 0 to 70° C. is preferable. When it is less than 0° C., the reaction proceeds slowly. When it exceeds 70° C., the peracid starts to decompose. The epoxidation can be proceeded, for example, by stirring the mixture of the raw materials for about 2 to 10 hours without requiring any special operation. The isolation of the epoxidized diene-series block copolymer (E) can be conducted by a conventional method, e.g., by precipitating with the use of a poor solvent, by pouring the reaction mixture into hot water with stirring to evaporate the solvent off, or by directly removing the solvent.

In the epoxidization, the amount of the epoxidizing agent is not strictly limited and may be freely selected according to the epoxidizing agent species, the desired degree of epoxidization, and species of the block copolymer (C) and/or partial hydrogenation product (D). It is desirable to select the amount of the epoxidizing agent so that the finally obtained epoxy-modified block copolymer (E) have an epoxy equivalent of about 140 to 2700.

The epoxy equivalent of the epoxy-modified block copolymer (E) is preferably about 200 to 2000 (e.g. about 300 to 1500). When epoxy equivalent is below 140, the elastic properties of the polymer can hardly be expressed. When it exceeds 2700, the characteristic physical properties resulting from epoxidization can hardly be expressed.

The epoxy group equivalent (the amount introduced) of the epoxy-modified block copolymer (E) is, in terms of the oxygen concentration of oxyrane, about 0.2 to 5.0% by weight, preferably about 0.3 to 4.5% by weight.

The epoxy equivalent is calculate as follows:

$$\text{Epoxy equivalent}=1600/X$$

where X is the concentration (% by weight) of oxirane oxygen in an epoxy-modified block copolymer.

The epoxy equivalent represents the weight of epoxy-modified block copolymer per mole of oxirane oxygen. The oxygen concentration of oxyrane can be determined by titration using a solution of hydrogen bromide in acetic acid.

The acid-modified or acid group-containing block copolymer (F) is a modified resin modified by being subjected to the reaction (e.g. grafting reaction) of the block copolymer (C) and/or the hydrogenation product (D) thereof with a carboxylic acid or a derivative thereof. Examples of a carboxylic acid or a derivative thereof as a modifying agent, there may be exemplified polymerizable unsaturated carboxylic acids such as (meth)acrylic acid, itaconic acid, maleic acid, maleic anhydride, fumaric acid. In particular, carboxylic anhydrides (typically, maleic anhydride) are preferable.

The combination of the above-mentioned diene-series block copolymer (2) (particularly, a modified-diene block copolymer) and a polycarbonate-series resin can improve the compatibility even among the different resins, and make possible the production of good polymer blends.

The ratio of the diene-series block copolymer (2) is about 0.1 to 30 parts by weight, and preferably about 0.5 to 25 parts by weight, relative to 100 parts by weight of the polycarbonate-series resin.

The Second Thermoplastic Resin (3)

The another embodiment of the present invention is characterized by the combination of the polycarbonate-series resin (1) having the terminal hydroxyl group, the diene-series block copolymer (2), and the second thermoplastic resin (3).

The second thermoplastic resin as a component (3) is composed of a thermoplastic resin other than the polycarbonate-series resin (1) and the diene-series block copolymer (2). Examples of such thermoplastic resin are polyester-series resins (including polyarylate), polyamide-series resins, aromatic polyether-series resins, rubber-modified or rubber-containing polymers, polysulfide-series resins, acrylic resins, and polyolefinic resins.

As polyester-series resins, polyalkylene arylate-series resins can be used. The polyalkylene arylate is the reaction product from an aromatic dicarboxylic acid component comprising an aromatic dicarboxylic acid or a reactive derivative thereof (e.g. a lower alkyl ester such as dimethyl ester or an anhydride) and a diol component selected from among aliphatic, alicyclic and aromatic diols and essentially containing at least one of aliphatic and/or alicyclic diols, or a mixture of such reaction products. The polyalkylene arylate-series resin can be produced in the conventional manner, for example, by the esterification or transesterification process.

The aromatic dicarboxylic acid component comprises at least one member selected from terephthalic acid, naphthalenedicarboxylic acids (e.g. 2,6-naphthalenedicarboxylic acid), or reactive derivatives thereof (e.g. $C_{1-4}$alkyl esters, such as dimethyl terephthalate). A preferred aromatic dicarboxylic acid component can be constituted of at least terephthalic acid or a reactive derivative thereof.

The aromatic dicarboxylic acid component may contain at least one further dicarboxylic acid selected from among other dicarboxylic acids (e.g. aromatic dicarboxylic acids containing about 8 to 14 carbon atoms, such as phthalic acid, isophthalic acid and 4,4'-diphenyldicarboxylic acid; alicyclic dicarboxylic acids containing about 8 to 14, such as cyclohexanedicarboxylic acid and cyclohexanediacetic acid; aliphatic dicarboxylic acids containing about 4 to 12 carbon atoms, such as succininc acid, adipic acid, sebacic acid and azelaic acid).

The diol component comprises at least one diol selected, for example, from among aliphatic alkylenediols (e.g. $C_{2-12}$ aliphatic diols such as ethylene glycol, 1,3-propanediol, 1,4-butanediol, 2-ethyl-1,3-propanediol, neopentyl glycol, 1,5-pentanediol, 1,6-hexanediol, 3-ethyl-2,4-pentanediol, 2-methyl-2,4-pentanediol, 2,2,4-trimethyl-1,4-pentanedioland2,2,4-trimethyl-1,5-pentanediol, 2-ethyl-1,3-hexanediol, 2,2-diethyl-1,3-propanediol and 2,5-hexanediol, preferably straight-chain $C_{2-6}$alkylene glycols, in particular straight-chain $C_{2-4}$alkylene glycols) and alicyclic diols (e.g. cyclohexanediols such as 1,4-dihydroxycyclohexane, 1,4-cyclohexanedimethanol, 2,2-bis(4-hydroxycyclohexyl)propane, 2,4-dihydroxy-1,1,3,3-tetramethylcyclobutane).

The diol component may further be used in combination with an oxyalkylen glycol (diethylene glycol, triethylene glycol, dipropylene glycol, tripropylene glycol or the like), or an aromatic diol (e.g. diols containing about 6 to 21 carbon atoms such as 1,4-di($\beta$-hydroxyethoxy)benzene, 2,2-bis(3-$\beta$-hydroxyethoxyphenoxy)propane, 2,2-bis(4-hydroxyethoxyphenyl)propape, 2,2-bis(4-hydroxypropoxyphenyl)propane, 2,2-bis(4-hydroxypropylphenyl)propane) or the like. These diol components may be used either singly or in combination of two or more.

A preferred diol component contains at least one diol selected from the group consisting of ethylene glycol, 1,4-butanediol and 1,4-cyclohexanedimethanol.

The polyalkylene arylate-series resin may have a branched structure, if necessary, which results from the use of a relatively small amount of a polyhydric alcohol (glycerin, trimethylolethane, trimethylolpropane, pentaerythritol or the like) or a polybasic carboxylic acid (trimesic acid, trimellitic acid or the like), or a derivative thereof.

Preferred polyalkylene arylate-series resins include, for example, polyalkylene terephthalates (poly-$C_{2-4}$alkylene terephthalates such as polyethylene terephthalate and polybutylene terephthalate), polyalkylene naphthalates (poly-$C_{2-4}$alkylene naphthalates such as polyethylene naphthalate and polybutylene naphthalate), poly(1,4-cyclohexanedimethylene terephthalate), and copolymers having these units or segments (copolyesters). The polyester-series resin may be a polyester elastomer.

The molecular weight of the polyalkylene arylate-series resin can be selected within the range of, for example, about 10000 to 1000000, preferably about 20000 to 500000, expressed in terms of weight average molecular weight.

Polyamide-series resins include, e.g., nylon 3, nylon 4-6, nylon 6, nylon 6-6, nylon 6-10, nylon 6-12, nylon 11, nylon 12, and copolymers of these polyamides (e.g. nylon 6/6-6/6-6-10, nylon 6/6-12, nylon 6-6/6-10/12). As the polyamide resin, a polyamide elastomer may be used.

Aromatic polyether-series resins include polyoxy-$C_{6-12}$arylenes (particularly polyphenylene ether-series resins) and the like.

The above-menthioned polyphenylene ether-series resins are homopolymers or copolymers having the repeating unit represented by the following formula (I) and/or (II). These polyphenylene ether-series resins can be used singly or in combination of two or more.

wherein $R^1$, $R^2$, $R^3$, $R^4$, $R^5$ and $R^6$ each independently represents an alkyl group having about 1 to 4 carbon atoms (e.g. methyl, ethyl, propyl, butyl and t-butyl group), an aryl group (e.g. phenyl) or a hydrogen atom, excluding the case where $R^5$ and $R^6$ are both hydrogen atoms.

As homopolymerpolyphenylene ether-series resins, there may be exemplified, poly(2,6-dimethyl-1,4-phenylene) ether, poly(2-methyl-6-ethyl-1,4-phenylene) ether, poly(2,6-diethyl-1,4-phenylene) ether, poly(2-methyl-6-n-propyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether and poly(2-methyl-6-hydroxyethyl-1,4-phenylene) ether. Among these resins, poly(2,6-dimethyl-1,4-phenylene) ether is most preferred.

The polyphenylene ether-series copolymer is a copolymer having the phenylene ether structure as its main monomer unit and includes, e.g., copolymers of a monomer for forming the homopolymer mentioned above (in particular 2,6-dimethylphenol) and other phenols, such as at least one member selected from copolymer of 2,6-dimethylphenol and 2,3,6-trimethylphenol, copolymer of 2,6-dimethylphenol and o-cresol, and copolymer of 2,6 dimethylphenol, 2,3,6-trimethylphenol and o-cresol.

Polysulfide-series resins include, for example, polysulfone resins. As polysulfone resins, there may be exemplified polysulfones, polyether sulfones and the like, and polysulfones may be obtained in the polycondensation reaction of dihalodiphenylsulfone with bisphenol A.

As acrylic resins, there may be exemplified homo- or copolymers obtained by use of monomers such as (meth) acrylonitriles, alkyl esters of (meth)acrylic acid, homopolymers of hydroxyl group-containing monomers [e.g. hydroxy $C_{1-4}$alkyl (meth)acrylates such as hydroxyethyl (meth) acrylate, hydroxypropyl (meth)acrylate], glycidyl group-containing monomers [e.g. glycidyl (meth)acrylate], or carboxyl group-containing monomers [e.g. (meth)acrylic acid], and copolymers of such monomers with other copolymerizable monomer (e.g. vinyl monomer). The alkyl esters of (meth)acrylic acid mentioned above include $C_{1-20}$ alkyl esters of (meth)acrylic acid such as methyl (meth)acrylate, ethyl (meth)acrylate, butyl (meth)acrylate, t-butyl (meth) acrylate, hexyl (meth)acrylate, octyl (meth)acrylate, 2-ethylhexyl meth)acrylate, lauryl (meth)acrylate. As a preferred crylic resin, polymethyl (meth)acrylate is exemplified.

As polyolefinic resins, there may be exemplified aliphatic polyolefins such as polyethylene, polypropylene, ethylene-propylene copolymer and aromatic polyolefins such as styrenic resins. Preferred polyolefinic resins include, e.g., styrenic resins.

The styrenic resins mentioned above may be a homopolymer or a copolymer of aromatic vinyl compounds, or a copolymer of an aromatic vinyl compound and a copolymerizable vinyl monomer.

As examples of the aromatic vinyl-series monomer for forming a styrenic resin, there may be exemplified styrene, alkylstyrenes (e.g. vinyltoluenes such as o-methylstyrene, p-methylstyrene and m-methylstyrene, p-ethylstyrene, p-isopropylstyrene, p-butylstyrene, p-t-butylstyrene, 2,4-dimethylstyrene) and α-alkylstyrenes (e.g. α-methylstyrene, α-ethylstyrene). These aromatic vinyl monomers may be used either alone or in combination. Styrene, vinyltoluenes and x-methylstyrene are preferred aromatic vinyl-series monomers. Styrene is more preferable.

The aromatic vinyl monomer(s) may be used in combination with a compolymerizable monomer or monomers (e.g. $C_{1-10}$ alkyl esters of (meth)acrylic acid such as methyl (meth)acrylate; α,β-ethylenically unsaturated carboxylic acids such as acrylic acid and methacrylic acid; unsaturated polybasic carboxylic acids or acid anhydrides thereof such as maleic acid and maleic anhydride; polymerizable imides such as maleimide, N-methylmaleimide and N-phenylmaleimide).

The styrenic resins mentioned above include, e.g., an acrylonitrile-styrene copolymer (AS resin), a methyl methacrylate-styrene copolymer (MS resin) and a polystyrene.

As the styrenic resin (3), a resin containing an acrylonitrile as a copolymerizable monomer may be used. A styrenic resin containing no acrylonitrile, namely an acrilonitrile-free styrenic resin, is preferred.

As rubber-modified polymers, copolymers of the above-mentioned resins and rubber-like polymers and the like can be used.

Examples of the rubber-like polymer (rubber component) are diene-series rubbers [e.g. polybutadienes (low cis-type or high cic-type polybutadienes), isoprene rubber, styrene-butadiene copolymers, ethylene-butadiene copolymers], ethylene-vinyl acetate copolymers, acrylic rubbers, ethylene-propylene rubbers (EPDM), ethylenebutene rubbers, chlorinated polyethylene rubbers, fluorinated rubbers, silicone rubbers, urethane rubbers, epichlorohydrin rubbers, and polysulfide rubbers. These rubber-like polymers can be used singly or as a mixture or copolymer of two or more, or as a hydrogenation product thereof. Commercial products may be used as the ruber-like polymer.

Preferred rubber-like polymers are polymers of conjugated 1,3-dienes or derivatives thereof (e.g. a polymer of 2-chloro-1,3-butadiene, or 1-chloro-1,3-butadiene), in particular diene rubbers (e.g. polybutadiene (butadiene rubber), isoprene rubber, styrene-butadiene copolymer rubber, etc.)

Preferred second thermoplastic resins may be polymers of aromatic vinyl monomers, or polymers improved in quality by using a rubber-like polymer (rubber-modified styrenic resins).

The rubber-modified styrenic resin is a polymer comprising a matrix composed of an aromatic vinyl-series polymer (styrenic resin) and a rubber or rubber-like polymer dispersed in the form of particles in the matrix. It may be either a block copolymer or a graft copolymer. The rubber-modified styrenic resin includes, e.g., graft polymers in which a polymerization unit containing an a-monoolefin having 2 to 8 carbon atoms as a main repeating structural unit is graft-polymerized to other polymer (e.g. graft polymers in which an acrylonitrile-styrene copolymer is graft-polymerized with an ethylene-propylene copolymer; graft polymers in which an acrylonitrile-styrene copolymer is graft-polymerized with an etylene-butene copolymer; graft polymers in which a butyl acrylate-methyl methacrylate copolymer is graft-polymerized to an ethylene-butene copolymer; graft polymers in which a methyl methacrylate-styrene copolymer is graft-polymerized to an ethylene-butene copolymer); acrylonitrile-ethylene propylene rubber-styrene copolymers (AES resin); acrylonitrile-acrylic rubber-styrene copolymers (AAS resin); acrylonitrile-chlorinated polyethylene-styrene copolymers (ACS resin), methyl methacrylate-butadiene-styrene copolymers (MBS resin); styrene-acrylonitrile-butadiene-(meth)acrylic acid copolymers; high impact resistance polystyrenes (HIPS); styrene-acrylonitrile-butadiene copolymers (ABS resin); hydrogenation products of styrene-crylonitrile-butadiene copolymers; styrene-acrylonitrile-ethylene copolymers; styrenic block copolymers (e.g. styrene-isoprene-styrene (SIS) copolymer, styrene-butadiene-styrene (SBS) copolymer, styrene-ethylene-butylene-styrene (SEBS) copolymer. High impact resistnace polystyrenic resins that are not ABS resins are preferred.

Preferred as the rubber-modified polystyrenic resin is a graft copolymer that can usually be obtained by polymerizing a monomer mixture containing at least one aromatic vinyl-series monomer in the presence of a rubber or rubber-like polymer in a conventional manner (e.g. bulk polymerization, bulk suspension polymerization, solution polymerization, emulsion polymerization).

The molecular weight of the polystyrenic resin (including rubber-modified polystyrenic resins) is not so critical and may, for example, be about $1 \times 10^4$ to $100 \times 10^4$, preferably about $5 \times 10^4$ to $50 \times 10^4$, in particular about $10 \times 10^4$ to $50 \times 10^4$ in terms of weight average molecular weight.

The content of the rubber-like polymer (rubber component) in the rubber-modified polystyrenic resin is, e.g., about 2 to 30% by weight, preferably about 5 to 25% by weight, in particular about 5 to 20% by weight.

The dispersed form of the rubber-like polymer dispersed in the matrix of a polystyrenic resin is not critical and includes the core/shell structure, onion structure, salami structure and the like. The rubber-like polymer constituting the dispersed phase may have a particle size selected, depending on the applications of the resin composition, from the range of, e.g., about 0.1 to 10 μm. preferably about 0.2 to 7 μm, in particular about 0.5 to 5 μm, in terms of volume average particle size.

Moreover, as the second thermoplastic resin, there may be used polyimides or rubbers of substantially low saturation or unsaturation degree. The rubbers include, for example, hydrogenation products of styrene/butadiene rubbers; hydrogenation products of nitrile rubbers; ethylene/propylene rubbers; ethylene/propylene/diene rubbers; ethylene/butene rubbers; ethylene/butadiene rubbers; acrylic rubbers; chlorinated polyethylene rubbers; fluorinated rubbers; silicone rubbers; urethane rubbers; epichlorohydrin rubbers; polysulfide rubbers; hydrogenation products of styrene/butadiene block copolymers; α,β-unsaturated nitrile/acrylate, and onjugated diene copolymer rubbers.

The above-mentioned second thermoplastic resins can be used either singly or in combination of two or more. Particularly preferred second thermoplastic resins are polyamide resins; polyester resins; polyamide elastomers; polyester elastomers; polymethyl methacrylate resins; polyphenylene ether resins and styrenic resins (particularly rubber-modified styrenic resins).

When employed such thermoplastic resin(s), the diene-series copolymer (2) may be added to the resin composition composed of a polycarbonate resin and styrenic resin to form the present resin composition. In this case, the flowability or fluidity of the resin composition can be improved by using a styrenic resin containing no acrylonitrile unit (particularly non-ABS-series resin). Further, the above mentioned preferred resins are effective for improving mechanical properties of an aromatic polycarbonate resin. The characteristics of the present invention can be further improved by using such styrenic resins in combination with the polyalkylene arylate, the polyphenylene ether resin, or the polyalkylene arylate and the polyphenylene ether resin.

In the preferred embodiment of the present invention, the domain (dispersed phase) of the styrenic resin (3) is surrounded or encapsulated by or with the diene-series block copolyer (2). In other words, the diene-series block copolymer (2) functions as a compatibilizing agent and does exist in nearly the whole interfaces between the matrix constituted of the polycarbonate-series resin (1) and the domain constituted of the styrenic resin (3).

Figure 1:
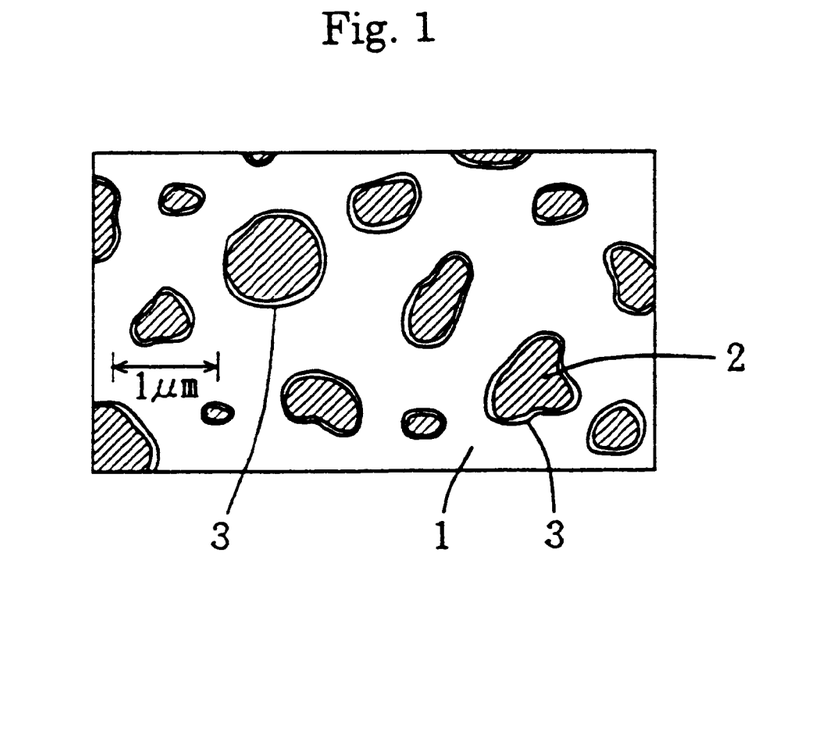
FIG. 1 is a schematic reproduction of an electron photomicrograph, in section, of a thermoplastic resin composition constituted of polycarbonate, polystyrene and a compatibilizing agent.
Figure 2:
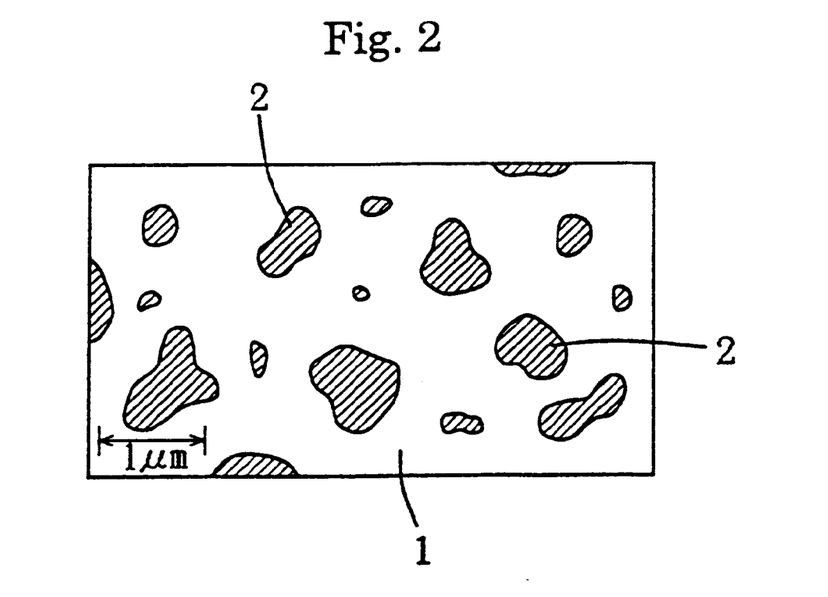
FIG. 2 is a schematic reproduction of an electron photomicrograph, in section, of a resin composition constituted of polycarbonate and polystyrene.

FIG. 1 is a schematic reproduction of an electron photomicrograph of a thermoplastic resin composition composed of a bisphenol A-based polycarbonate (1) having a hydroxyl group as an end group, a styrenic resin (3a) and an epoxy-modified block copolymer (a compatibilizing agent). FIG. 2 is a schematic reproduction of an electron photomicrograph of a resin composition obtained by excluding the compatibilizing agent (2) from the thermoplastic resin composition mentioned above. In the resin composition containing no compatibilizing agent, as shown in FIG. 2, no compatibilizing agent exists in the interfaces between the matrix 1 constituted of the polycarbonate and the domain 3 constituted of the polystyrene. On the contrary, in the thermoplastic resin composition of the present invention, the diene-series block copolymer 2 does exists, as a compatibilizing agent, in the interfaces between the matrix 1 constituted of the polycarbonate and the domain 3 constituted of the polystyrene and thus the domain 2 is enclosed or encapsulated in the block copolymer 3. The thickness of the block copolymer 3 in the interfaces may be uniform or non-uniform all over or all around. The thickness of the block copolymer 3 may depend on the amount used of the block copolymer, hence cannot be specified. However, it is, for example, about 0.5 to 500 nm (e.g. 1 to 100 nm), and preferably about 3 to 50 nm. In the electron photomicrograph, it can be confirmed by osmic acid staining that the component existing in the interface between the matrix and the domain mentioned above is the very block copolymer 2.

For forming polymer blends having such capsule structure, various species of diene-series block copolymer (2) mentioned above can be used. Nevertheless, the particularly preferred species of diene-series block copolymer (3) are epoxy-modified copolymers (E). Further, among diene-series block copolymers (3), diene-series block copolymers terminally having a B block (particularly, block copolymers having the linear A-B block structure or the linear A-B-A-B block structure, among these, particularly epoxy-modified copolymers (E)) are preferable.

The thermoplastic resin composition may further contain a flame retardant (4).

Flame Retardant (4)

The flame retardant as the component (4) of the present invention includes halogen-containing flame retardants, phosphorus-containing flame retardants, organic or inorganic antimony compounds, inorganic flame retardants, etc. These flame retardants may be used singly or in combination of two or more.

As the halogen-containing flame retardants, there may be mentioned, e.g., bromine and/or chlorine atom-containing (in particular bromine atom-containing) organic compounds such as halogenated bisphenols (e.g. brominated bisphenols, brominated bisphenol oligomer such as tetrabromobisphenol A, tetrabromobisphenol A-based epoxy resin oligomer, brominated bisphenol-based phenoxy resin), halogenated aromatic compounds (e.g. decabromodiphenyl oxide), halogenated polycarbonates (e.g. brominated bisphenol-based polycarbonate), halogenated aromatic vinyl polymers (e.g. brominated polystyrene, brominated crosslinked polystyrene), halogenated polyphenylene ethers (e.g. brominated polyphenylene oxide, polydibromophenylene oxide, decabromodiphenyl oxidebisphenol condensate), halogenated cyanurate resins and halogen-containing phosphoric esters.

The phosphorus-containing flame retardants that can be added to the resin composition of the present invention are not limited to particular species provided that they contain at least one phosphorus atom. They include organophosphorus compounds (e.g. phosphoric esters, phosphorus esters, phosphines, phosphine oxides, biphosphines, phosphonium salts, phosphinic acids and salts thereof) and inorganic salts of phosphoric acid.

As the phosphoric esters among the organophosphorus compounds, there may be exemplified orthophosphoric esters and condensates thereof such as aliphatic phosphoric esters (trimethyl phosphate, triethyl phosphate, tributyl phosphate, tri(2-ethylhexyl)phosphate, tributoxyethyl phosphate, trioleyl phosphate, dibutyl phosphate, monobutyl phosphate, di(2-ethylhexyl) phosphate, monoisodecyl phosphate, 2-acryloyloxyethyl acid phosphate, 2-methacryloyloxyethyl acid phosphate, dicyclopentyl hypodiphosphate, etc.), aromatic phosphoric esters (triphenyl phosphate, tricresyl phosphate, trixylenyl phosphate, tris(isopropylphenyl) phosphate, tris(o-phenylphenyl) phosphate, tris(p-phenylphenyl) phosphate, trinaphthyl phosphate, cresyl diphenyl phosphate, xylenyl diphenyl phosphate, di(isopropylphenyl) phenyl phosphate, o-phenylphenyl dicresyl phosphate, tris(2,6-dimethylphenyl)phosphate, tetraphenyl-m-phenylene diphosphate, tetraphenyl-p-phenylene diphosphate, phenyl/resorcin/polyphosphate, bisphenol A/bis(diphenylphosphate), bisphenol A/polyphenyl phosphate, dipyrocatechol hypodiphosphate, etc.), aliphatic-aromatic phosphoric esters (diphenyl (2-ethylhexyl) phosphate, diphenyl 2-acryloyloxyethyl phosphate, diphenyl-2-methacryloyloxyethyl phosphate, phenyl neopentyl phosphate, pentaerythritol diphienyl diphosphate, ethyl pyrocatechol phosphate, etc.).

Among the organophosphorus compounds, the phosphite esters include phosphite esters such as aromatic phosphites (triphenyl phosphite, trisnonylphenyl phosphite, phenyl pyrocatechol phosphite, etc.), aliphatic phosphites (tristridecyl phosphate, dibutyl hydrogen phosphate, methyl neopentyl phosphate, pentaerythritol diethyl diphosphite, dineopentyl hypophosphite, etc.) and condensates thereof.

The organophosphorus compounds also include methyl neopentyl phosphate, triphenylphosphine oxide, tricresylphosphine oxide, diphenyl methanephosphonate, diethyl phenylphosphonate, etc.

These organophosphorus compounds may be used singly or in combination of two or more.

The inorganic salts of phosphoric acid mentioned above as phosphorus-containing flame retardants include, for example, ammonium polyphosphate and the like.

Red phosphorus may be used as the phosphorus-containing flame retardant. Red phosphorus may be one surface-treated beforehand. The surface treatment of red phosphorus includes, among others, treatment for coating with a coat film of a metal hydroxide (e.g. magnesium hydroxide, zinc hydroxide, aluminum hydroxide, titanium hydroxide), treatment for coating with a coat film comprising such metal hydroxide and a thermosetting resin, and treatment for coating with a plurality of layers comprising a coat film of the metal hydroxide and a coat film of a thermosetting resin.

Preferred phosphorus-containing flame retardants are organophosphorus compounds having at least one ester-forming oxygen atom directly bound to a phosphorus atom (organic phosphates) and condensates thereof. Such organophosphorus compounds, when added to the thermoplastic resin composition, provide the composition with flame retardancy and improve the impact resistance. Among the phosphate esters, aromatic phosphate esters (triphenyl phosphate etc.) and condensates thereof are particularly preferred.

The total carbon number of the substituent on the aromatic ring in the aromatic phosphoric esters can appropriately be selected and it may be about 10 to 20 (e.g. 12 to 18). Asalkyl-substituted aromatic phosphate esters, there may be mentioned, for example, bis $C_{5-10}$-alkylphenyl phenyl phosphates (bisnonylphenyl phenyl phosphate etc.). Among the phosphoric esters, hydroxyl group-containing aromatic phosphate esters (e.g. phosphate esters having at least one phenolic hydroxyl group substituted at the aromatic phosphoric esters such as tricresyl phosphate and triphenyl phosphate) are also preferred. As examples of such phosphoric esters, there may be mentioned resorcinyl diphenyl phosphate, bisphenol A diphenyl phosphate and the like.

As examples of the organic antimony compounds, there may be mentioned antimony esters with organic acids [e.g. antimony tartrate, antimony caproate, $Sb(OCH_2CH_3)_3$, $Sb[OCH(CH_3)CH_2CH_3]_3$], cycloalkyl antimonate(e.g. antimony polymethylene glycolate, aryl antimonate compounds (e.g. triphenylantimony)].

As examples of the inorganic antimony compounds, there may be mentioned antimony oxide ($Sb_2O_3$), antimony phosphate, $KSb(OH)_6$, $NH_4SbF_6$, $SbS_3$, etc.

Preferred antimony compounds include antimony oxide.

As examples of the inorganic flame retardants, there may be mentioned various metal compounds, for example metal hydroxides such as calcium hydroxide, dolomite, hydrotalcite, etc., metal oxides such as tin oxide, zirconium oxide, etc; metal carbonates which may be basic metal carbonates, such as magnesium carbonate, zinc carbonate, calcium carbonate, barium carbonate, etc.; and metal borates such as zinc borate, zinc metaborate, barium metaborate, etc. These inorganic flame retardants may be used singly or in combination of two or more.

The thermoplastic resin composition of the present invention may further include, in addition to the flame retardant mentioned above, a flame retardant auxiliary (5).

Flame retardant Auxiliary (5)

As examples of the flame retardant auxiliary (5), which is the component (5) of the present invention, there may be mentioned triazine compounds, novolak resins, metal compounds, silicone compounds (e.g. silicone resins or silicone oils), silica, aramid fiber, polyacrylonitrile fiber and fluorine-containing resins, etc. For the purpose of attaining higher flame retardancy, such flame retardant auxiliary is used with the flame retardant (F) mentioned above. As the flame retardant auxiliary, at least one flame retardant auxiliary selected from these compounds can be used.

As the triazine compounds, there may be mentioned compounds having the triazine skeleton which is effective in improving the flame retardancy, for example melamine and derivatives thereof (melam, melem, melone, melamine cyanurate, melamine phosphate, melamine resins, BT resins, etc.) and guanamine and derivatives thereof (succinoguanamine, adipoguanamine, methylglutaroguanamine, etc.), among others.

The novolak resins are obtained by subjecting a phenol and an aldehyde to condensation in the presence of an acid catalyst (e.g. sulfuric acid, hydrochloric acid, phosphoric acid) and are effective as drip inhibitors preventing the live glowing masses from dropping on the occasion of burning.

As the phenol which is the starting material for the novolak resins, there may be mentioned, for example, phenol, phenols (cresols such as o-, m- and p-cresol, etc.) having one or more substituents selected from among $C_{1-20}$ alkyl groups (methyl, ethyl, isopropyl, t-butyl, n-octyl, stearyl, etc.), aryl groups (phenyl etc.), alkoxy groups (methoxy, ethoxy, etc.), aryloxy groups (phenoxy etc.) and the like, pyrocatechol, resorcinol, hydroquinone, salicylaldehyde, salicylic acid, p-hydroxybenzoic acid, p- or o-cyanophenol, etc.

As examples of the aldehyde, there may be mentioned formaldehyde, acetaldehyde, n-propanal, isopropanal, n-butanal, isobutyraldehyde, benzaldehyde, etc.

Usable as the metal compounds are metal oxides (metal oxides such as aluminum oxide, iron oxide, titanium oxide, manganese oxide, magnesium oxide, zirconium oxide, zinc oxide, molybdenum oxide, cobalt oxide, bismuth oxide, tin oxide, antimony oxide, nickel oxide, copper oxide, tungsten oxide, etc., and composite metal oxides derived from these, etc.) and metal powders (metals corresponding to the metal oxides mentioned above and alloys of the metals).

The silicone compounds include silicone resins and silicone oils. The silicone resins can be obtained by polymerizing hydrolyzed organohalosilanes. The silicone oils include polydiorganosiloxanes, typically polydimethylsiloxane, and polydiorganosiloxanes having various substituents (e.g. $C_{1-6}$ alkyl, $C_{6-12}$ aryl, (meth)acryloyl, vinyl groups) as well.

The viscosity of the silicone oils is, at a temperature of 25° C., for example, about 500 to 1,000,000 centipoises, preferably 10,000 to 500,000 centipoises, more preferably about 90,000 to 150,000 centipoises.

Silica (e.g. amorphous silicon dioxide) may be surface-treated with a silane coupling agent (e.g. a silane coupling agent having at least one functional group selected from among hydrocarbon, vinyl, epoxy, and amino groups) or the like.

The aramid fiber can be prepared by dissolving isophthalamide or polyparaphenyleneterephthalamide in a solvent (amide solvent or sulfuric acid) and performing solution spinning. The mean fiber diameter is usually about 1 to 500 μm, and the mean fiber length is generally about 0.1 to 10 mm.

The mean fiber diameter of the polyacrylonitrile fiber can be selected within the range of about 1 to 500 μm, and the mean fiber length within the range of about 0.1 to 10 mm.

The fluorine-containing resins (fluororesins) as the flame retardant auxiliaries are macromolecules having a number average molecular weight Mn of at least 10,000 and desirably have a glass transition temperature of not lower than −30° C. (preferably about 40 to 130° C., more preferably about 100 to 130° C.). The fluorine content in thefluorine-containing resins is about 50 to 76% by weight, preferably about 65 to 76% by weight, and more preferably about 70 to 76% by weight. The fluorine-containing resins are used in a powder form (particulate form) and the mean particle size of the fluorine-containing resins is, for example, about 0.05 to 1,000 μm, preferably about 0.08 to 20 μm. The density of the fluorine-containing resins is about 1.2 to 2.3 g/cm³.

The fluorine-containing resins are effective in further increasing the drip resistance. As examples of the fluorine-containing resins, there may be mentioned homopolymers and copolymers of fluorine-containing vinyl monomers, copolymers of a fluorine-containing vinyl monomer and a fluorine-free vinyl monomer (e.g. ethylene, propylene), for example, polymonofluoroethylene, polydifluoroethylene, polytrifluoroethylene, polytetrafluoroethylene, polyvinylidene fluoride, tetrafluoroethylene-hexafluoropropylene copolymer, ethylene-tetrafluoroethylene copolymer and the like. The preferred fluororesins include polytetrafluoroethylene. These fluorine-containing resins may be added singly or in combination of two or more.

Additives

The resin composition of the present invention may contain, when necessary, one or more flowability improving agents, for example, copolymers of an aromatic vinyl monomer (e.g. styrene) and a (meth)acrylate monomer (e.g. a $C_{1-8}$ alkyl (meth)acrylate such as methyl (meth)acrylate or butyl (meth)acrylate), aliphatic hydrocarbons (wax such as liquid paraffin, paraffin, microcrystalline wax, polyolefin wax and partial oxidants therof), higher fatty acids (saturated fatty acids such as caproic acid, palmitic acid and stearic acid, and unsaturated fatty acids such as recinolic acid), higher fatty acid esters (stearic acid triglyceride etc.), higher fatty acid amides (stearamide, oleamide (oleic acid amide), ethylenebisstearamide (ethylenebisstearic acid amide), etc.), higher alcohols (stearyl alcohol etc.), metal soaps, etc.

Furthermore, the resin composition of the present invention may contain various additives, for example, talc (e.g. talc having a mean particle diameter of about 0.1 to 50 μm), stabilizers (antioxidants, ultraviolet absorbers, light stabilizers, heat stabilizers, etc.), reinforcing agents, antistatic agents, lubricants, mold release agents (mold lubricants), fillers, color tone improving agents, colorants (e.g. pigments, dyes), plasticizers, crystal nucleus agents, etc.

As examples of the fillers, there may be mentioned, e.g., an aluminium powder, metal oxides such as iron and nickel oxide, nonmetals such as carbon filament, silicates (e.g. mica, aluminum silicate (clay)), asbestos, titanium dioxide, novaculite, whisker such as potassium titanate and other titanates, glass flakes, glass beads, glass fibers, polymer fibers, etc.

Proportions of Components

The proportions of the respective components in the thermoplastic resin composition of the present invention are as follows.

In the thermoplastic resin composition, the proportion of the diene-series block copolymer (2) (i.e. the block copolymer (C) to the acid-modified block copolymer (F)) is about 0.1 to 30 parts by weight, and preferably about 0.1 to 25 parts by weight (e.g. about 0.5 to 20 parts by weight) relative to 100 parts by weight of the resin composition comprising the polycarbonate-series resin (1) and the second thermoplastic resin (3). The proportions of the polycarbonate resin (1) and the second thermoplastic resin (3) are former/latter= about 1/99 to 99/1 (% by weight), preferably about 30/70 to 95/5 (% by weight), and more preferably about 40/60 to 90/10 (% by weight).

In particular, when the second thermoplastic resin is a styrenic resin, the proportion of the diene-series block copolymer (2) is about 0.1 to 20 parts by weight, preferably about 0.5 to 15 parts by weight (e.g. 1 to 10 parts by weight), and more preferably about 1 to 5 parts by weight relative to 100 parts by weight of the resin composition comprising the polycarbonate-series resin (1) and the styrenic resin (3). The proportions of the polycarbonate-series resin (1) and the styrenic resin (3) are former/latter=about 30/70 to 95/5 (% by weight), preferably about 40/60 to 90/10 (e.g. 50/50 to 90/10)(% by weight), and particularly 60/40 to 80/20 (% by weight). In this case, when the proportion of the polycarbonate-series resin is below 30% by weight, the heat deformation temperature will be low. When it exceeds 95% by weight, the moldability or processability tends to decrease. Further, when the amount of the diene-series block copolymer (2) is below 0.1 part by weight, the compatibility between the polycarbonate-series resin and the styrenic resin is not satisfactory improved and the mechanical properties of the produced thermoplastic resin composition may decrease in some cases. On the other hand, when the addition level exceeds 20 parts by weight, it may adversely affect the flame retardancy and/or lower the bending or flexural modulus and the heat deformation temperature.

When the styrenic resin is used with a polyalkylene arylate or a polyphenylene ether, the proportion of the polyalkylene arylate and/or polyphenylene ether-series resin is about 0.1 to 20 parts by weight (e.g. 0.2 to 15 parts by weight), preferably 0.5 to 10 parts by weight, and more preferably about 0.5 to 5 parts by weight, relative to 100 parts by weight of the resin composition comprising the polycarbonate-series resin (1) and the styrenic resin (3).

Although the use of the polyalkylene arylate resin is not essential, the addition of the polyalkylene arylate-series resin is conducive to further improvement in the compatibility between the polycarbonate-series resin and polystyrene-series resin, hence improvement in surface impact strength. When the polyalkylene arylate-series resin is added in an amount exceeding 20 parts by weight, the flame retardancy is adversely affected and the Izod impact strength tends to decrease. The polyphenylene ether-series resin may also not be added, and the addition of the polyphenylene ether-series further enhances the compatibility between the polycarbonate-series resin and the polystyrene-series resin, hence the surface impact strength and flame retardancy. When the polyphenylene ether-series resin is added in an amount exceeding 20 parts by weight, the Izod impact strength tends to decrease.

The content of the flame retardant (4) can be selected, according to the flame retardant species, for example, within the range of about 1 to 40 parts by weight, preferably about 5 to 30 parts by weight, and more preferably about 8 to 20 parts by weight relative to 100 parts by weight of the resin composition comprising the polycarbonate-series resin (1) and the second thermoplastic resin (3) such as the styrenic resin. When the addition level of the flame retardant is lower than 1 part by weight, the flame retardant effect is insufficient. When it exceeds 40 parts by weight, the mechanical characteristics of the flame-retarded thermoplastic resin composition tend to decrease.

The organophosphorus compounds (in particular phosphate esters and condensates thereof), which are preferred flame retardants, are used in an amount of about 1 to 40 parts by weight, preferably about 3 to 30 parts by weight, and more preferably about 5 to 20 parts by weight relative to 100 parts by weight of the resin composition comprising the polycarbonate-series resin (1) and the second thermoplastic resin (3) such as the styrenic resin.

The amount of the flame retardant auxiliary (5) can be selected, according to the flame retardant auxiliary species, e.g., within the range not larger than 30 parts by weight (e.g. 0.01 to 30 parts by weight), and preferably about 0.01 to 10 parts by weight relative to 100 parts by weight of the resin composition comprising the polycarbonate-series resin (1) and the second thermoplastic resin (3) such as styrenic resin.

The fluorine-containing resins, which are preferred as the flame retardant auxiliary, are used in an amount of about 0. 05 to 5 parts by weight, and preferably about 0.1 to 1 part by weight relative to 100 parts by weight of the resin composition comprising the polycarbonate-series resin (1) and the second thermoplastic resin (3) such as the styrenic resin. When the fluorine-containing resin is used within the above range, the combined use thereof with the flame retardant (in particular an organophosphorus compound) results in sufficiently preventing dripping which is otherwise caused by plasticization of the resin, without impairing the mechanical characteristics of the flame retarded resin composition. Therefore, it is advantageous to use the fluorine-containing resin, which is preferred flame retardant auxiliary, as an auxiliary flame retardant in combination with the organophosphorus compound mentioned above.

Moreover, a practically useful degree of flame retardancy can be obtained even without adding a fluorine-containing resin or other flame retardant auxiliary, and this flame-retardant thermoplastic resin composition has excellent flowability and impact resistance.

The amount of the flowability improving agents can be selected, where necessary, within the range of about 0.1 to 10 parts by weight, preferably 0.1 to 5 parts by weight, and more preferably about 0.1 to 2 parts by weight relative to 100 parts by weight of the resin composition of the polycarbonate-series resin (1) and the the second thermoplastic resin (3) such as the styrenic resin.

The thermoplastic resin composition and flame-retarded thermoplastic resin composition of the present invention can be prepared by blending up the respective components using a conventional means. For example, the resin composition of the present invention can be produced by preliminarily mixing, when necessary, the respective components in suitable amounts with a mixer such as a Henschel mixer, tumbler blender or kneader, then melt kneading the components by using an extruder or kneading machine such as heated rolls or a Banbury mixer, and pelletizing or grinding treatment.

In accordance with the present invention, the polymer blends of a polycarbonate-series resin and the second thermoplastic resin (3) such as a polystyrenic resin such as a rubber-modified polystyrenic resin, which have so far been difficult to modify, can be effectively modified. In particular, the thermoplastic resin composition and flame-retarded thermoplastic resin composition of the present invention are excellent in moldability, impact resistance, thermal stability and flame retardancy. Therefore, the resin composition of the present invention is useful in molding OA equipment, communication equipment, housings for household electric appliances, chassis, other shaped parts, shaped parts for automobiles and the like. The resin composition of the present invention can be molded by various techniques such as injection molding, extrusion molding and blow molding. Practically, molded articles may be obtained by injection molding.

In accordance with the present invention, the compatibility and dispersibility among different resins can be markedly improved and the improved impact resistance of the resin composition can be realized by the combined use of a specific polycarbonate-series resin and a diene-series block copolymer which may be modified, even in polymer blends comprising a polycarbonate-series resin and a diene-series block copolymer.

Moreover, such combination can significantly improve the compatibility with the second thermoplastic resin as well as the compatibility between the two resins mentioned above. Further, even in a polymer blend comprising a polycarbonate-series resin and a polystyrenic resin as main resin components, thermoplastic resin compositions having flow characteristics, moldability or processability, impact strength comparable to those of a polymer blend of a polycarbonate-series resin and a ABS resin can be realized by adding the diene-series block copolymer (i.e. the combination of a polycarbonate-series resin, polystyrenic resin and a diene-series block copolymer). Furthermore, such combination can effectively modify the polymer blends mentioned above, and thermoplastic resin compositions provided with high flame retardancy can be obtained by adding a flame retardant or a flame retardant auxiliary. In particular, by selecting the flame retardant and flame retardant auxiliary, flame-retarded thermoplastic resin compositions which are not only excellent in flame retardancy, impact resistance and moldability but also highly safe and noncorrosive and halogen-free can be obtained.

EXAMPLES

The following examples illustrate the present invention concretely. They are, however, by no means limitative of the scope of the present invention.

The evaluation methods used in the following examples and comparative examples are as follows.

(1) Impact Strength (in kg·cm/cm)

The impact strength was evaluated, according to the ASTM test method D 256, using test specimens having a thickness of ¼ inch with the notched Izod impact strength as a measure.

(2) Surface Impact Strength (drop-weight impact strength, in kgf·cm)

The drop-weight impact strength was evaluated using flat plate test specimens having a thickness of 2 mm together with a falling weight weighing 4 kg and having a punch diameter=20R.

(3) Flame Retardancy (UL 94)

Based on the vertical flame test (94 V-0) specified in the U. S. UL specification UL 94 as a measure for flame retardancyevaluation, test specimens (bar samples) having a thickness of 1/16 inch were evaluated.

(4) Flowability (in mm)

The distance of flow in a spiral flow cavity (section: 2 mm thick, 20 mm wide) was measured at a cylinder temperature of 250° C., a mold temperature of 60° C. and an injection pressure of 500 kg/cm$^2$.

The polycarbonates (1), diene-series block copolymers (2) (compatibilizing agent) and polystyrenic resins (3) used in Examples and Comparative Examples were prepared in accordance with the following Synthesis Examples. The viscosity average molecular weight and the concentration of terminal hydroxyl group of each polycarbonate-series resin were calculated as follows.

(Viscosity average molecular weight)

The intrinsic viscosity (η) of a methylene chloride was measured with the Ubbelohde viscometer at 20° C., and the viscosity average molecular weight (Mv) was calculated by using the following formula.

$$[\eta]=1.11\times10^{-4} (Mv)0.82$$

(Terminal hydroxyl group concentration)

The concentration of terminal hydroxy group was calculated from the ratio of 114.80 ppm and 129.50 ppm measured by the method $^{13}$C-NMR (measuring mode: gated coupling).

Synthesis Example 1

Synthesis of an Aromatic Polycarbonate Resin (1-1) by a Molten Transesterification A colorless clear aromatic polycarbonate resin was obtained by charging a flask with 22.8 kg (100 mole) of 2,2-bis(4-hydroxyphenyl)propane, 21.9 kg (102.5 mole) of diphenyl carbonate and an aqueous solution of 85 mg (1×10$^{-3}$ mole) of lithium metaborate dihydrate, and 1.0 g (2.4×10$^{-2}$ mole) of a boric acid, melting the charge under nitrogen at 180° C., elevating the temperature with well stirring to reach finally 0.1 torr and 270° C. in order to evaporate the phenol formed. The viscosity average molecular weight of the resin was Mw=23,000, and the terminal hydroxy group concentration was 28 mole %.

Synthesis Example 2

Synthesis of the Epoxy-modified Hydrogenated Diene-series Block Copolymer A

A jecketed reactor equipped with a stirrer and thermometer was charged with 300 g of a polystyrene-polybutadiene-polystyrene diene-series block copolymer [product of Japan Synthetic Rubber Co., Ltd, TR2000] and 300 g of a cyclohexane, and the mixture was dissolved. Then, to the mixed solution was added a mixture prepared by mixing 40 ml of a di-P-tolylbis(1-cyclopentadienyl) titanium/cyclohexane solution (concentration: 1 mmole/lit.) as a catalyst and 8 ml of a n-butyllithium solution (concentration: 5 mmole/lit.) at 0° C. under the hydrogen pressure of 2.5 kg/cm$^2$, and the mixture was allowed to react at a hydrogen partial pressure of 2.5 kg/cm$^2$ for 30 minutes at 60° C. The solvent of the obtained partial hydrogenated copolymer solution was removed by drying under reduced pressure (hydrogenation rate of the total butadiene moiety: 30%). The reactor (a 2 liter flask equipped with a jacket) was charged with 300 g of the partially hydrogenated polymer and 1500 g of cyclohexane, and the mixture was dissoloved. Then, to the mixture was continuously added dropwise 300 g of a 30% (by weight) peracetic acid solution in ethyl acetate, and the epoxidization reaction was conducted at 40° C. for 3 hours with stirring. To obtain the hydrogenated diene-series block copolymer which is epoxidized (epoxy-modified copolymer A), the reaction mixture was cooled to a room temperature, taken out from the reactor, precipitated the polymer by adding a large amount of methanol, filtrated, washed with water and dried. The epoxy equivalent of the epoxy-modified copolymer A was 275.

Synthesis Example 3

Synthesis of the Epoxy-modified Diene-series Block Copolymer B

A jacketed reactor equipped with a stirrer and thermometer was charged with 300 g of a polystyrene-polybutadiene-polystyrene diene-series block copolymer [Japan Synthetic Rubber Co., Ltd., TR2000] and 1500 g of ethyl acetate. Then, 169 g of a 30% (by weight) preacetic acid solution in ethyl acetate was continuously dropwised to the mixture, and the epoxidization reaction was carried out at 40° C. for 3 hours with stirring.

The reaction mixture was turned to a room temperature, taken out from the reactor, precipitated the polymer by adding a large amount of methanol, filtrated, washed with water and dried to obtain the epoxidized diene-series sblock copolymer (epoxy-modified copolymer B). The epoxy equivalent of the epoxy-modified copolymer B was 470.

Synthesis Example 4

Synthesis of the Epoxy-modified Diene-series Block Copolymer C

A jacketed reactor equipped with a stirrer, reflux condenser and thermometer was charged with 300 g of a diene-series block copolymer of polystyrene-polybutadiene [product of Asahi Chemical Industry Co., Ltd.; Asaflex 810] and 1500 g of cyclohexane, and the charge was dissolved. Then, to this block copolymer solution was continuously added dropwise 150 g of a 30% (by weight) peracetic acid solution in ethyl acetate, and the epoxidization reaction was conducted at 40° C. for 3 hours with stirring.

The reaction mixture was turned to a room temperature, take out from the reactor, precipitated the polymer by adding a large amount of methanol, filtrated, washed with water and dried to obtain the epoxidized diene-series block copolymer (epoxy-modified copolymer C). The epoxy equivalent of the epoxy-modified copolymer C was 650.

Synthesis Example 5

Synthesis of the Epoxy-modified Diene-series Block Copolymer D

A jacketed reactor equipped with a stirrer, reflux condenser and thermometer was charged with 300 g of a styrene-butadiene-styrene-butadiene block copolymer [product of Asahi Chemical Industry Co., Ltd.; Asaflex 810, styrene/butadiene=70/30 (weight ratio)] and 900 g of ethyl acetate, and the charge was dissolved to prepare the block copolymer solution. Then, to the block copolymer solution was continuously added dropwise 130 g of a 30% (by weight) peracetic acid solution in ethyl acetate, and epoxidiation reaction was carried out at 40° C. for 3 hours with stirring.

The reaction mixture was turned to a room temperature, washed with water, taken out from the reactor and removed the solvent by drying under reduced pressure. The epoxy equivalent of the resultant epoxy-modified block copolymer D was 767.

Synthesis Example 6

Synthesis of the Epoxy-modified Diene-series Block Copolymer E

A jacketed reactor equipped with a stirrer, ref lux condenser and thermometer was charged with 300 g of a styrene-butadiene-styrene block copolymer [product of Japan Synthetic Rubber Co., Ltd.; TR2000, styrene/butadiene=40/60 (weight ratio)] and 1500 g of ethyl acetate, and the charge was dissolved to prepare the block copolymer solution. Then, to this block copolymer solution was continuously added dropwise 169 g of a 30% (by weight) peracetic acid solution in ethyl acetate, and the epoxidization reaction was conducted at 40° C. for 3 hours with stirring. The reaction mixture was cooled to a room temperature, washed with water, taken out from the reactor and precipitated the polymer by adding a large amount of methanol. The precipitate was filtrated, washed with water and dried to obtain the epoxy-modified block copolymer E. The epoxy equivalent of the obtained epoxy-smodified block copolymer E was 510.

Synthesis Example 7

Synthesis of the Styrenic Resin

To 100 parts by weight of a mixture comprising 90 parts by weight of styrene monomer and 10 parts by weight of a polybutadiene rubber (product of Nippon Zeon Co., Ltd.; BR1220SG) was added 10 parts by weight of ethylbenzene and 0.015 parts by weight of ditartiary-butyl peroxide (DTBPO), and the mixture was dissolved. A tank-type reactor equipped with a stirrer was charged with the obtained starting solution for polymerization. The polymerization temperature in the reactor was adjusted to 120 to 150° C.

The polymerization was continued until the polymerization conversion of styrene reached 79%. While heating this polymerization mixture in a twin-screw extruder at 230° C., the volatile matter was removed under reduced pressure, and the residue was pelletized. Analysis of the thus-obtained rubber-modified polystyrene resin revealed a rubber content of 8.9% by weight, a volume average rubber particle size of 2.1 µm, and a weight average molecular weight Mw=215,000.

The rubber-modified polystyrenic resin obtained in Synthesis Example 7 is hereinafter referred to as HIPS-1.

Synthesis Example 8

Synthesis of the Styrenic Resin

A rubber-modified polystyrene resin was obtained by following the procedure of Synthesis Example 7 except that 85 parts by weight of the styrene monomer and 15 parts by weight of the polybutadiene rubber (product of Nippon Zeon Co., Ltd.; BR 1220SG) were used. Analysis of the rubber-modified polystyrene resin obtained gave a rubber content of 11.5% by weight, a volume average rubber particle size of 1.8 µm, and a weight average molecular weight Mw of 220,000.

The rubber-modified polystyrenic resin obtained in Synthesis Example 8 is hereinafter referred to as HIPS-2.

In the Examples and Comparatives, the following materials were used.

(1) Polycarbonate-series Resin:

(1-1) Bisphenol A-based polycarbonate resin

The resin synthesized in Synthesis Example 1 (Proportion of the terminal hydroxy group relative to the whole of the terminals: 28 mole %, Number-average molecular weight: Mn=23000)

(1-2) Bisphenol A-based polycarbonate resin (Proportion of the terminal hydroxy group relative to the whole terminals: 0 mole %, Number-average molecular weight: Mn=22000)

(1-3) Bisphenol A-based polycarbonate resin (Proportion of the terminal hydroxy group relative to the whole terminals: 7.4 mole %, Number-average molecular weight: Mn=22000)

(1-4) Bisphenol A-based polycarbonate resin (Proportion of the terminal hydroxy group relative to the whole terminals: 22.4 mole %, Number-average molecular weight: Mn=22000)

(1-5) Aromatic carbonate resin HPC by phosgene method (Product of Mitsubishi Gas Chemical Company, Inc.: Iupiron S3000 (tradename), Terminal hydroxyl group concentration: below 1 mole % and not more than the identification (detectable) limit)

The concentrations of the terminal hydroxyl group of the polycarbonate-series resins (1-3) and (1-4) were respectively adjusted based on the charged mole ratio of the bisphenol A and the diphenyl carbonate. The proportion of the terminal hydroxy group relative to the whole of the terminals was calculated by $^{13}$C-NMR (Apparatus: product of JEOL, JNM-A500 High-resolution NMR)

(2) Diene-series Block Copolymer:

(2-1) the epoxy-modified hydrogenated block copolymer A obtained in Synthesis Example 2

(2-2) the epoxy-modified block copolymer B obtained in Synthesis Example 3

(2-3) the epoxy-modified block copolymer C obtained in Synthesis Example 4

(2-4) the epoxy-modified block copolymer D obtained in Synthesis Example 5

(2-5) the epoxy-modified block copolymer E obtained in Synthesis Example 6

(2-6) Styrene-butadiene-styrene block copolymer

The styrene-butadiene block copolymer used in Synthesis Example 5 (product of Japan Synthetic Rubber Co., Ltd., TR2000, styrene/butadiene=40/60 (weight ratio)

(2-7) Styrene-butadiene-styrene-butadiene block copolymer

The styrene-butadiene block copolymer used in Synthesis Example 6 (product of Asahi Chemical Industry Co., Ltd., Asaflex810, styrene/butadiene=70/30 (weight ratio))

(3) The Second Thermoplastic Resin:
Styrenic Resin:
  (3-1) Aromatic vinyl-diene-vinyl cyanide copolymer ABS (product of Daicel Chemical Industries, Ltd., Cevian V (tradename))
  (3-2) Acrylonitrile-styrene copolymer AS (product of Daicel Chemical Industries, Ltd., Cevian N (tradename))
  (3-3) Polybutylene terephthalate PBT (product of Polyplastics Co., Ltd.; Duranex 400FP)
  (3-4) Polymethacrylate resin PMMA (product of Mitsubishi Rayon; Acrypet IR-H-70)

(4-3) A condensed Phosphate ester represented by the following formula (III) [product of Daihachi Chemical Industry Co., Ltd.; CR-733S]
  (4-4) A condensed phosphate ester represented by the following formula (IV) [product of Daihachi Chemical Industry Co., Ltd.; CR-741]
  (4-5) A condensed phosphate ester represented by following formula (V) [product of Daihachi Chemical Industry Co., Ltd.; PX-200]

(3-5) Polystyrene PS (Product of Daicel Chemical Industries, Ltd.; R53)
  (3-6) Nylon 6 (product of Ube Industries, Ltd.)
  (3-7) Polyarylate PAR (product of Unitika Ltd.; U polymer P5001, an alloy with polycarbonate)
  (3-8) ABS resin (product of Daicel Chemical Industies, Ltd.; Cevian V520)
  (3-9) HIPS-1 obtained in Synthesis Example 8
  (3-10) HIPS-2 obtained in Synthesis Example 9 Polyalkylene arylate-series resin:
  (3-11) Poly(1,4-cyclohexanedimethylene terephthalate) containing ethylene glycol as a comonomer component [PCTG; product of Eastman Chemical Company; Easter DN003]
Polyphenylene Ether-seriess Resin:
  (3-12) Poly(2,6-diethyl-1,4-phenylene) ether [product of GE Specialty Chemicals, Inc.; BLENDEX HPP820]
(4) Flame Retardant (organophosphorus compound):
  (4-1) Trinonylphenyl phosphite
  (4-2) Triphenyl phosphate (5) Flame Retardant Auxiliary (fluorine-containing resin):
  (5-1) Polytetrafluoroethylene [product of Mitsui-Du Pont Fluorochemicals Co., Ltd.; Teflon 6-J]

Examples 1 and 2

Comparative Examples 1 and 2

According to Table 1, the polycarbonate-series resin(l), diene-series block copolymer (2) and the styrenic resin (3) were mixed in a Henshell mixer, and the mixtures were melt-kneaded with the use of a twin-extruder (product of Ikegai Tekko Co., Ltd.; PCM-30) to pelletize the resin compositions. Then, each resin composition in pellet form was molded into test specimens for physical properties testing (ASTM dumb-bell) using an injection molding machine (product of Meiki Seisakusho; SJ45/70; metal mould temperature: 50° C.), and the physical properties were measured.

Moreover, for a comparison, a resin having the terminal hydroxyl group concentration of less than 1 mole % was used as the polycarbonate resin, and the evaluation was made in the same manner as in Examples. The results were shown in Table 1.

TABLE 1

|  | Example 1 | Example 2 | Comparative Example 1 | Comparative Example 2 |
|---|---|---|---|---|
| Polycarbonate (pbw)* | (1-1) 60 | (1-1) 60 | (1-5) 60 | (1-5) 60 |
| Diene-series copolymer (pbw)* | (2-2) 4 | (2-3) 4 | (2-2) 4 | (2-3) 4 |
| Thermoplastic resin (pbw)* | (3-1)/10 (3-2)/30 | (3-1)/10 (3-2)/30 | (3-1)/10 (3-2)/30 | (3-1)/10 (3-2)/30 |
| Izod impact strength (kgcm/cm) | 50 | 58 | 40 | 35 |

*parts by weight

Examples 3 to 14 and Comparative Example 3 to 14

According to Tables 2 to 7, the specimens were prepared and the physical properties were measured in the same manner as in Example 1 except that various thermoplastic resins were used instead of using (3-1) and (3-2) of Example 1. The results thus obtained are shown in Tables 2 to 7.

TABLE 2

|  | Example 3 | Example 4 | Comparative Example 3 | Comparative Example 4 |
|---|---|---|---|---|
| Polycarbonate (pbw)* | (1-1) 70 | (1-1) 70 | (1-5) 70 | (1-5) 70 |
| Diene-series copolymer (pbw)* | (2-1) 10 | (2-2) 10 | (2-1) 10 | (2-2) 10 |
| Thermoplastic resin (pbw)* | (3-3) 30 | (3-3) 30 | (3-3) 30 | (3-3) 30 |
| Izod impact strength (kgcm/cm) | 18 | 12 | 15 | 10 |

*parts by weight

TABLE 3

|  | Example 5 | Example 6 | Comparative Example 5 | Comparative Example 6 |
|---|---|---|---|---|
| Polycarbonate (pbw)* | (1-1) 80 | (1-1) 80 | (1-5) 80 | (1-5) 80 |
| Diene-series copolymer (pbw)* | (2-2)/10 | (2-2)/10 (2-3)/10 | (2-2)/10 | (2-3)/10 |
| Thermoplastic resin (pbw)* | (3-4) 20 | (3-4) 20 | (3-4) 20 | (3-4) 20 |
| Izod impact strength (kgcm/cm) | 9 | 5 | 4 | 2 |

*parts by weight

TABLE 4

|  | Example 7 | Example 8 | Comparative Example 7 | Comparative Example 8 |
|---|---|---|---|---|
| Polycarbonate (pbw)* | (1-1) 70 | (1-1) 70 | (1-5) 70 | (1-5) 30 |
| Diene-series copolymer (pbw)* | (2-1) 10 | (2-2) 10 | (2-1) 10 | (2-2) 10 |
| Thermoplastic resin (pbw)* | (3-5) 30 | (3-5) 30 | (3-5) 30 | (3-5) 70 |
| Izod impact strength (kgcm/cm) | 12 | 8 | 5 | 3 |

*parts by weight

TABLE 5

|  | Example 9 | Example 10 | Comparative Example 9 | Comparative Example 10 |
|---|---|---|---|---|
| Polycarbonate (pbw)* | (1-1) 80 | (1-1) 80 | (1-5) 80 | (1-5) 80 |
| Diene-series copolymer (pbw)* | (2-1) 5 | (2-3) 5 | (2-1) 5 | (2-3) 5 |
| Thermoplastic resin (pbw)* | (3-6) 20 | (3-6) 20 | (3-6) 20 | (3-6) 20 |
| Izod impact strength (kgcm/cm) | 18 | 15 | 12 | 10 |

*parts by weight

TABLE 6

|  | Example 11 | Example 12 | Comparative Example 11 | Comparative Example 12 |
|---|---|---|---|---|
| Polycarbonate (pbw)* | (1-1) 30 | (1-1) 30 | (1-5) 30 | (1-5) 30 |
| Diene-series copolymer (pbw)* | (2-1) 10 | (2-3) 10 | (2-1) 10 | (2-3) 10 |
| Thermoplastic resin (pbw)* | (3-7) 70 | (3-7) 70 | (3-7) 70 | (3-7) 70 |
| Flame retardant (pbw)* | (4-1) 0.5 | (4-1) 0.5 | (4-1) 0.5 | (4-1) 0.5 |
| Izod impact strength (kgcm/cm) | 90 | 85 | 80 | 75 |

*parts by weight

TABLE 7

|  | Example 13 | Example 14 | Comparative Example 13 | Comparative Example 14 |
|---|---|---|---|---|
| Polycarbonate (pbw)* | (1-1) 100 | (1-1) 100 | (1-5) 100 | (1-5) 100 |
| Diene-series copolymer (pbw)* | (2-1) 10 | (2-2) 10 | (2-1) 10 | (2-2) 10 |
| Izod impact strength (kgcm/cm) | 90 | 85 | 85 | 80 |

*parts by weight

Examples 15 to 24, Comparative Examples 15 to 17

The materials mentioned above were blended in a tumbler blender according to the formulation and proportions (parts by weight) shown in Tables 8 to 10, and the mixtures were melt-kneaded with an extruder to give resin composition in the form of pellets. Then, each resin composition in pellet form was molded into test specimens using an injection molding machine (cylinder temperature 240° C., mold temperature 60° C.), which were subjected to physical properties testing. The results thus obtained are shown in Tables 8 to 10.

TABLE 8

|  | Examples | | | | |
| --- | --- | --- | --- | --- | --- |
|  | 15 | 16 | 17 | 18 | 19 |
| Polycarbonate (pbw)* | (1-4) 80 | (1-4) 80 | (1-3) 80 | (1-4) 80 | (1-4) 80 |
| Diene-series copolymer (pbw)* | (2-4)/2 | (2-4)/2 | (2-4)/2 | (2-5)/5 | (2-6)/5 |
| Thermoplastic resin (pbw)* | (3-9) 20 | (3-10) 20 | (3-10) 20 | (3-10) 20 | (3-10) 20 |
| Izod impact strength (kgcm/cm) | 68 | 75 | 64 | 70 | 52 |
| Drop-weight impact strength** | 140 | 180 | 170 | 155 | 170 |
| Flow (mm) | 118 | 115 | 116 | 110 | 111 |

*parts by weight
**2 mm thick/kgf · cm

TABLE 9

|  | Examples | | | | |
| --- | --- | --- | --- | --- | --- |
|  | 20 | 21 | 22 | 23 | 24 |
| Polycarbonate (pbw)* | (1-4) 80 | (1-4) 80 | (1-3) 80 | (1-4) 80 | (1-4) 70 |
| Diene-series copolymer (pbw)* | (2-4)/1 (2-7)/1 | (2-4)/2 | (2-4)/2 | (2-4)/2 | (2-4)/2 |
| Themoplastic (3-10) resin (pbw)* | 20 | 20 | 20 | 20 | 30 |
| (3-11) | — | 1 | — | 1 | — |
| (3-12) | — | — | 1 | 1 | — |
| Izod impact strength (kgcm/cm) | 48 | 69 | 67 | 63 | 51 |
| Drop-weight impact strength** | 180 | 220 | 370 | 390 | 330 |
| Flow (mm) | 116 | 118 | 117 | 118 | 130 |

*parts by weight
**2 mm thick/kgf · cm

TABLE 10

|  | Comparative Example | | |
| --- | --- | --- | --- |
|  | 15 | 16 | 17 |
| Polycarbonate (pbw)* | (1-4) 80 | (1-2) 80 | (1-3) 80 |
| Diene-series copolymer (pbw)* | — | (2-4)/2 | — |
| Thermoplastic resin (pbw)* | (3-10) 20 | (3-10) 20 | — |
| Izod impact strength (kgcm/cm) | 7 | 39 | 50 |
| Drop-weight impact strength** | 30 | 120 | 390 |
| Flow (mm) | 122 | 116 | 98 |

*parts by weight
**2 mm thick/kgf · cm

As is evident from Tables shown above, the thermoplastic resin compositions of Examples which are mainly composed of the polycarbonate-series resin and rubber-modified polystyrenic resin showed almost the same impact strength and higher flowability (moldability or processability) as compared with the polymer blends of polycarbonate-series with ABS-series resin.

Further, the observation of the electron photomicrograph of the Example 15 test specimen (in section) reveals thecapsule structure shown in FIG. 1. In the morphology wherein the rubber-modified styrenic resin is dispersed as domains in the polycarbonate resin matrix, the domains were surrounded by the epoxy-modified block copolymer.

Examples 25 to 38, Comparative Examples 18 to 20

The materials mentioned above were blended in a tumbler blender according to the formulation and proportions (parts by weight) shown in Table 11 to 14, and the mixtures were melt-kneaded in an extruder to give resin composition in the form of pellets. Then, each resin composition in a pellet form was molded into test specimens using an injection molding machine (cyliynder temperature 240° C., mold temperature 60° C.), and these specimens were subjected to physical properties testing. The results thus obtained are shown in Tables 11 to 14.

TABLE 11

|  | Examples | | | | |
| --- | --- | --- | --- | --- | --- |
|  | 25 | 26 | 27 | 28 | 29 |
| Polycarbonate (pbw)* | (1-4) 80 | (1-4) 80 | (1-2) 80 | (1-4) 80 | (1-4) 80 |
| Diene-series copolymer (pbw)* | (2-4)/2 | (2-4)/2 | (2-4)/2 | (2-4)/5 | (2-5)/5 |
| Thermop (3-10) lastic (3-11) resin (3-12) (pbw)* | 20 — — | 20 — — | 20 — — | 20 — — | 20 — — |
| Flame retardant (pbw)* | (4-2) 12 | (4-2) 12 | (4-2) 12 | (4-3) 15 | (4-2) 12 |
| Flame retardant auxiliary (pbw)* | — | (5-1) 0.5 | (5-1) 0.5 | (5-1) 0.5 | (5-1) 0.5 |
| Izod impact strength (kgcm/cm) | 50 | 51 | 44 | 36 | 48 |
| Drop-weight impact strength** | 110 | 115 | 110 | 95 | 120 |
| Flow (mm) | 225 | 226 | 229 | 235 | 220 |
| Flame retardancy (UL94) | V-2 | V-0 | V-0 | V-0 | V-0 |

*parts by weight
**2 mm thick/kgf · cm

TABLE 12

|  | Examples | | | | |
| --- | --- | --- | --- | --- | --- |
|  | 30 | 31 | 32 | 33 | 34 |
| Polycarbonate (pbw)* | (1-4) 80 | (1-4) 80 | (1-4) 80 | (1-4) 80 | (1-4) 70 |
| Diene-series copolymer (pbw)* | (2-4)/1 (2-7)/1 | (2-4)/2 | (2-4)/2 | (2-4)/2 | (2-5)/2 |
| Thermop (3-10) lastic (3-11) resin (3-12) (pbw)* | 20 — — | — 1 — | — — 1 | — 1 1 | 30 — — |
| Flame retardant (pbw)* | (4-2) 12 | (4-2) 12 | (4-2) 10 | (4-3) 10 | (4-2) 14 |
| Flame retardant auxiliary (pbw)* | (5-1) 0.5 | (5-1) 0.5 | (5-1) 0.5 | (5-1) 0.5 | (5-1) 0.5 |
| Izod impact strength (kgcm/cm) | 39 | 45 | 43 | 42 | 36 |
| Drop-weight impact strength** | 115 | 160 | 340 | 350 | 100 |
| Flow (mm) | 225 | 226 | 229 | 235 | 220 |
| Flame retardancy (UL94) | V-0 | V-0 | V-0 | V-0 | V-0 |

*parts by weight
**2 mm thick/kgf · cm

TABLE 13

| | Examples | | | |
|---|---|---|---|---|
| | 35 | 36 | 37 | 38 |
| Polycarbonate (pbw)* | (1-4) 80 | (1-4) 80 | (1-4) 80 | (1-4) 80 |
| Diene-series copolymer (pbw)* | (2-4)/1 | (2-4)/2 | (2-4)/2 | (2-4)/2 |
| Thermoplastic resin (pbw)* (3-10) | 20 | 20 | 20 | 20 |
| (3-11) | — | — | — | — |
| (3-12) | — | — | 1 | 1 |
| Flame retardant (pbw)* | (4-4) 15 | (4-5) 15 | (4-2)/5 (4-5)/7.5 | (4-2)/5 (4-3)/7.5 |
| Flame retardant auxiliary (pbw)* | (5-1) 0.5 | (5-1) 0.5 | (5-1) 0.5 | (5-1) 0.5 |
| Izod impact strength (kgcm/cm) | 38 | 30 | 36 | 40 |
| Drop-weight impact strength** | 105 | 100 | 260 | 320 |
| Flow (mm) | 228 | 230 | 225 | 226 |
| Flame retardancy (UL94) | V-0 | V-0 | V-0 | V-0 |

*parts by weight
**2 mm thick/kgf · cm

TABLE 14

| | Comparative Example | | |
|---|---|---|---|
| | 18 | 19 | 20 |
| Polycarbonate (pbw)* | (1-4) 80 | (1-2) 80 | (1-2) 80 |
| Diene-series copolymer (pbw)* | — | (2-4)/2 | — |
| Thermoplastic resin (pbw)* | (3-10) 20 | (3-10) 20 | (3-8) 20 |
| Flame retardant (pbw)* | (4-2) 12 | (4-2) 12 | (4-2) 12 |
| Flame retardant auxiliary(pbw)* | (5-1) 0.5 | (5-1) 0.5 | (5-1) 0.5 |
| Izod impact strength (kgcm/cm) | 4 | 20 | 40 |
| Drop-weight impact strength** | 20 | 100 | 330 |
| Flow (mm) | 229 | 226 | 19B |
| Flame retardancy (UL94) | V-0 | V-0 | V-0 |

*parts by weight
**2 mm thick/kgf · cm

As is evident from tables, as regards the flame retardant- and flame-retardant auxiliary-containing flame retardant thermoplastic resin compositions, the resin compositions of examples were comparable in impact resistance and more excellent in flame retardancy and flowability (moldability or processability) as compared with the polycarbonate-series resin- and ABS-series resin-based compositions.

What is claimed is:

1. A polycarbonate having an epoxidized block copolymer comprising (1) a polycarbonate skeleton-containing resin having a terminal hydroxy group of 1 to 40 mole % relative to the whole of the terminals and (2) a diene-containing block copolymer which is an epoxy-modified block copolymer (E) wherein the epoxy-modified block copolymer (E) has, in the same molecule, a polymer block (A) comprising mainly a vinyl aromatic compound and a polymer block (B) comprising mainly a conjugated diene compound, wherein a double bond derived from the conjugated diene compound is epoxidized.

2. A polycarbonate having an epoxidized block copolymer as claimed in claim 1, wherein the proportion of the terminal hydroxy group relative to the whole of the terminals of said polycarbonate skeleton-containing resin (1) is 5 to 40 mole %.

3. A polycarbonate having an epoxidized block copolymer as claimed in claim 1, wherein said diene-containing block copolymer (2) is
   an epoxy-modified block copolymer (E) in which a double bond derived from the conjugated diene compound of at least one block copolymer selected from the block copolymer (C) and the partial hydrogenation product (D) is epoxidized.

4. A polycarbonate having an epoxidized block copolymer as claimed in claim 1, wherein an amount of the introduced-epoxy group of said epoxy-modified block copolymer (E) is, in terms of the oxirane oxygen concentration, 0.2 to 5.0% by weight.

5. A polycarbonate having an epoxidized block copolymer as claimed in claim 1, in which the proportion of said diene-containing block copolymer is 0.1 to 30 parts by weight relative to 100 parts by weight of said polycarbonate skeleton-containing resin.

6. A polycarbonate having an epoxidized block copolymer as claimed in claim 1, which further comprises a second thermoplastic resin (3).

7. A polycarbonate having an epoxidized block copolymer as claimed in claim 6, wherein said second thermoplastic resin (3) is at least on member selected from the group consisting of a polyester-series resin, a polyamide-series resin, an aromatic polyether-series resin, a rubber-modified polymer, a polysulfide-series resin, an acrylic resin and a polyolefinic resin.

8. A polycarbonate having an epoxidized block copolymer as claimed in claim 6, wherein said second thermoplastic resin (3) is styrenic resin.

9. A polycarbonate having an epoxidized block copolymer as claimed in claim 8, wherein said styrenic resin (3) is a rubber-modified styrenic resin.

10. A polycarbonate having an epoxidized block copolymer as claimed in claim 6, wherein the ratio of said polycarbonate skeleton-containing resin (1) to said second thermoplastic resin (3) is 1/99 to 99/1 (% by weight), and the proportion of said diene-containing block copolymer (2) is 0.1 to 30 parts by weight relative to 100 parts by weight of the resin composition comprising said polycarbonate skeleton-containing resin (1) and said second thermoplastic resin (3).

11. A polycarbonate having an epoxidized block copolymer as claimed in claim 8, wherein the ratio of the said polycarbonate skeleton-containing resin (1) to said styrenic resin (3) is 30/70 to 95/5 (% by weight), and the proportion of said diene-containing block copolymer (2) is 0.1 to 20 parts by weight relative to 100 parts by weight of the resin composition comprising said polycarbonate skeleton-containing resin (1) and said styrenic resin (3).

12. A polycarbonate having an epoxidized block copolymer as claimed in claim 9, wherein the styrenic resin domains constituting a dispersed phase is surrounded by said diene-containing block copolymer (2).

13. A polycarbonate having an epoxidized block copolymer as claimed in claim 1, wherein said diene-containing block copolymer (2) has a B block as a terminal block.

14. A polycarbonate having an epoxidized block copolymer as claimed in claim 8, which comprises 0.1 to 20 parts by weight of a polyalkylene arylate-series resin relative to 100 parts by weight of the resin composition comprising said polycarbonate skeleton-containing resin (1) and said styrenic resin (3).

15. A polycarbonate having an epoxidized block copolymer as claimed in claim 8, which comprises 0.1 to 20 parts by weight of a polyphenylene ether-series resin relative to 100 parts by weight of the resin composition composed of said polycarbonate skeleton-containing resin (1) and said styrenic resin (3).

16. A polycarbonate having an epoxidized block copolymer as claimed in claim 8, which further comprises 1 to 40 parts by weight of a flame retardant (4) relative to 100 parts by weight of the resin composition composed of said polycarbonate skeleton-containing resin (1) and said styrenic resin (3).

17. A polycarbonate having an epoxidized block copolymer as claimed in claim 8, which further comprises 0.01 to 30 parts by weight of a flame retardant auxiliary (5) relative to 100 parts by weight of the resin composition composed of said polycarbonate skeleton-containing resin (1) and said styrenic resin (3).

18. A polycarbonate having an epoxidized block copolymer as claimed in claim 17, wherein said flame retardant auxiliary (5) is a fluorine-containing resin, and the content of the fluorine-containing resin is 0.05 to 5 parts by weight relative to 100 parts by weight of the resin composition.

* * * * *

UNITED STATES PATENT AND TRADEMARK OFFICE
CERTIFICATE OF CORRECTION

PATENT NO. : 6,111,016
DATED : August 29, 2000
INVENTOR(S): Masahiro KATAYAMA et al.

It is certified that error appears in the above-identified patent and that said Letters Patent are hereby corrected as shown below:

In category [54], please amend the title from "POLYCARBONATE WITH EPOXIDIZED BLOCK COPOLYMER" to read -- POLYCARBONATE RESIN COMPOSITION --.

In the first line of each of claims 1-18, please change "having an epoxidized block copolymer" to --resin composition--.

Signed and Sealed this

First Day of May, 2001

Attest:

NICHOLAS P. GODICI

Attesting Officer      Acting Director of the United States Patent and Trademark Office